(12) United States Patent
Swarts et al.

(10) Patent No.: US 8,369,279 B2
(45) Date of Patent: Feb. 5, 2013

(54) METHOD AND SYSTEM FOR ITERATIVE MULTIPLE FREQUENCY HYPOTHESIS TESTING WITH CELL-ID DETECTION IN AN E-UTRA/LTE UE RECEIVER

(75) Inventors: Francis Swarts, San Diego, CA (US); Mark Kent, Vista, CA (US)

(73) Assignee: Broadcom Corporation, Irvine, CA (US)

( * ) Notice: Subject to any disclaimer, the term of this patent is extended or adjusted under 35 U.S.C. 154(b) by 194 days.

(21) Appl. No.: 12/732,052

(22) Filed: Mar. 25, 2010

(65) Prior Publication Data

US 2011/0223901 A1    Sep. 15, 2011

Related U.S. Application Data

(60) Provisional application No. 61/312,555, filed on Mar. 10, 2010.

(51) Int. Cl.
*H04W 4/00* (2009.01)
*H04J 3/06* (2006.01)
(52) U.S. Cl. ........................ 370/330; 370/503
(58) Field of Classification Search .............. None
See application file for complete search history.

(56) References Cited

U.S. PATENT DOCUMENTS

| | | | |
|---|---|---|---|
| 8,059,767 B2 | 11/2011 | Furman et al. | |
| 2002/0054624 A1 | 5/2002 | Boloorian | |
| 2003/0012268 A1* | 1/2003 | Doetsch et al. | 375/149 |
| 2003/0099206 A1 | 5/2003 | Jones et al. | |
| 2004/0062298 A1* | 4/2004 | McDonough et al. | 375/150 |
| 2005/0238087 A1* | 10/2005 | Yang et al. | 375/219 |
| 2007/0218854 A1 | 9/2007 | Lawrence et al. | |
| 2008/0019350 A1 | 1/2008 | Onggosanusi et al. | |
| 2008/0090600 A1 | 4/2008 | Demir et al. | |
| 2009/0017768 A1 | 1/2009 | Makarov | |
| 2009/0034501 A1* | 2/2009 | Hahm et al. | 370/342 |
| 2009/0034589 A1* | 2/2009 | Hahm et al. | 375/150 |
| 2009/0041162 A1 | 2/2009 | Li et al. | |
| 2009/0086713 A1* | 4/2009 | Luo | 370/350 |
| 2009/0219883 A1* | 9/2009 | Cho et al. | 370/330 |
| 2010/0098031 A1 | 4/2010 | Charbit | |
| 2010/0128824 A1 | 5/2010 | Hui | |
| 2010/0158079 A1* | 6/2010 | Li et al. | 375/147 |
| 2010/0182979 A1 | 7/2010 | Malladi et al. | |
| 2011/0026413 A1 | 2/2011 | Swarts et al. | |
| 2011/0026648 A1 | 2/2011 | Swarts et al. | |
| 2011/0026649 A1* | 2/2011 | Lipka et al. | 375/343 |
| 2011/0151817 A1 | 6/2011 | Swarts et al. | |

* cited by examiner

*Primary Examiner* — Eunsook Choi
(74) *Attorney, Agent, or Firm* — Sterne, Kessler, Goldstein & Fox PLLC

(57) ABSTRACT

A mobile device receives a signal comprising a PSS and a SSS. The mobile device performs iterative MFHT utilizing a reduced number of MFH branches. At each iteration, frequency offset estimation and Cell-ID detection are concurrently performed. An iteration starts with selecting initial frequency offsets spanning a frequency offset estimation range. The selected initial frequency offsets are placed in the MFH branches. A particular MFH branch with a maximum PSS correlation peak magnitude is selected at the iteration. A frequency offset estimate in the selected MFH branch is utilized for frequency control. The frequency offset estimation range utilized for the current iteration is reduced for the next iteration. A Cell-ID is declared if the Cell-ID is consistently detected not only within a particular iteration on the basis of having detected consistent cell ID information for the first and second halves of a radio frame, but also from iteration to iteration.

15 Claims, 9 Drawing Sheets

US 8,369,279 B2

METHOD AND SYSTEM FOR ITERATIVE MULTIPLE FREQUENCY HYPOTHESIS TESTING WITH CELL-ID DETECTION IN AN E-UTRA/LTE UE RECEIVER

CROSS-REFERENCE TO RELATED APPLICATIONS/INCORPORATION BY REFERENCE

This patent application claims the benefit of U.S. Provisional Patent Application Ser. No. 61/312,555, filed on Mar. 10, 2010.

This application makes reference to:
U.S. application Ser. No. 12/510,901, filed on Jul. 28, 2009;
U.S. application Ser. No. 12/510,956, filed on Jul. 28, 2009; and
U.S. application Ser. No. 12/721,979, filed on Mar. 11, 2010.

Each of the above stated applications is hereby incorporated herein by reference in its entirety.

FIELD OF THE INVENTION

Certain embodiments of the invention relate to communication systems. More specifically, certain embodiments of the invention relate to a method and system for iterative multiple frequency hypothesis testing with Cell-ID detection in an E-UTRA/LTE UE receiver.

BACKGROUND OF THE INVENTION

Various communication standards such as Evolved Universal Terrestrial Radio Access (E-UTRA), also called Long Term Evolution (LTE), have been developed to offer comparatively high data rates to support high quality services. LTE is a Third Generation Partnership Project (3GPP) standard that provides for an uplink speed of up to 50 megabits per second (Mbps) and a downlink speed of up to 100 Mbps. The LTE/E-UTRA standard represents a major advance in cellular technology. The LTE/E-UTRA standard is designed to meet current and future carrier needs for high-speed data and media transport as well as high-capacity voice support. The LTE/E-UTRA standard brings many technical benefits to cellular networks, some of which include the benefits provided by Orthogonal Frequency Division Multiplexing (OFDM) and/or Multiple Input Multiple Output (MIMO) data communication. In addition, Orthogonal Frequency Division Multiple Access (OFDMA) and Single Carrier-Frequency Division Multiple Access (SC-FDMA) are used on the downlink (DL) and on the uplink (UL), respectively.

Mobility management represents an important aspect of the LTE/E-UTRA standard. As a mobile device, also called user equipment (UE) in the LTE/E-UTRA standard, moves within an LTE/E-UTRA coverage area, the use of synchronization signal transmissions and cell search procedures provide a basis for the mobile device or UE to detect and synchronize with individual cells. To communicate with a particular cell, mobile devices in associated LTE/E-UTRA coverage area needs to determine one or more cell specific transmission parameters such as, for example, symbol timing, radio frame timing, and/or a cell ID. In the LTE/E-UTRA standard, the cell-specific information is carried by reference, broadcast, and/or synchronization signals. The latter forms the basis for downlink (DL) synchronization and cell specific information identification at the mobile devices within the associated LTE/E-UTRA coverage area. Two downlink (DL) synchronization signals, namely Primary Synchronization Signal (PSS) and Secondary Synchronization Signal (SSS), are used to allow the mobile devices to synchronize to transmission timing of the particular cell, and thereby obtain cell specific information such as full physical Cell ID, and/or a Cell ID group indicator.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for iterative multiple frequency hypothesis testing with Cell-ID detection in an E-UTRA/LTE UE receiver, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for iterative multiple frequency hypothesis testing with Cell-ID detection in an E-UTRA/LTE UE receiver. A mobile device is operable to receive a radio frequency (RF) signal from an associated base station. The received signal may comprise a PSS and a SSS, which may be used by the mobile device, which is also referred to as a UE, to acquire cell-specific parameters via the PSS synchronization and the SSS detection, respectively. To limit the use of resources, the mobile device utilizes a reduced number of MFH branches, for example, three MFH branches, to maintain an iterative multiple frequency hypothesis testing (MFHT). At each iteration, the mobile device is operable to concurrently perform frequency offset estimation and Cell-ID detection in each MFH branch. In an exemplary embodiment of the invention, iteration may start with three initial frequency offsets selected evenly or unevenly, depending on the statistics of receiver local oscillator signal frequency offset, over a frequency offset estimation range. Each of the three selected initial frequency offsets are assigned to one of the MFH branches, respectively, and the frequency offset estimation and the Cell-ID detection may be concurrently performed on the received signal at a current iteration. A particular MFH branch with a maximum PSS correlation peak magnitude is selected from the three MFH branches at the current iteration. A frequency offset estimate associated with the selected MFH branch is utilized for frequency control of a local frequency oscillator utilized in the mobile device. In instances where the frequency offset estimate is within a desired frequency offset range, iterations of the iterative MFHT may be stopped. Otherwise, iterations of the iterative MFHT may continue. In this regard, at the end of the current iteration, the frequency offset estimation range may be adjusted to prepare for the next iteration. Three different subsequent frequency offsets are generated for the next iteration based on the adjusted frequency offset estimation range. A Cell-ID is declared for a serving cell if the Cell-ID is consistently detected not only within a particular iteration, that is, on the basis of consistent cell ID information detected in the first and second halves of a radio frame, but also from iteration to iteration.

Figure 1:
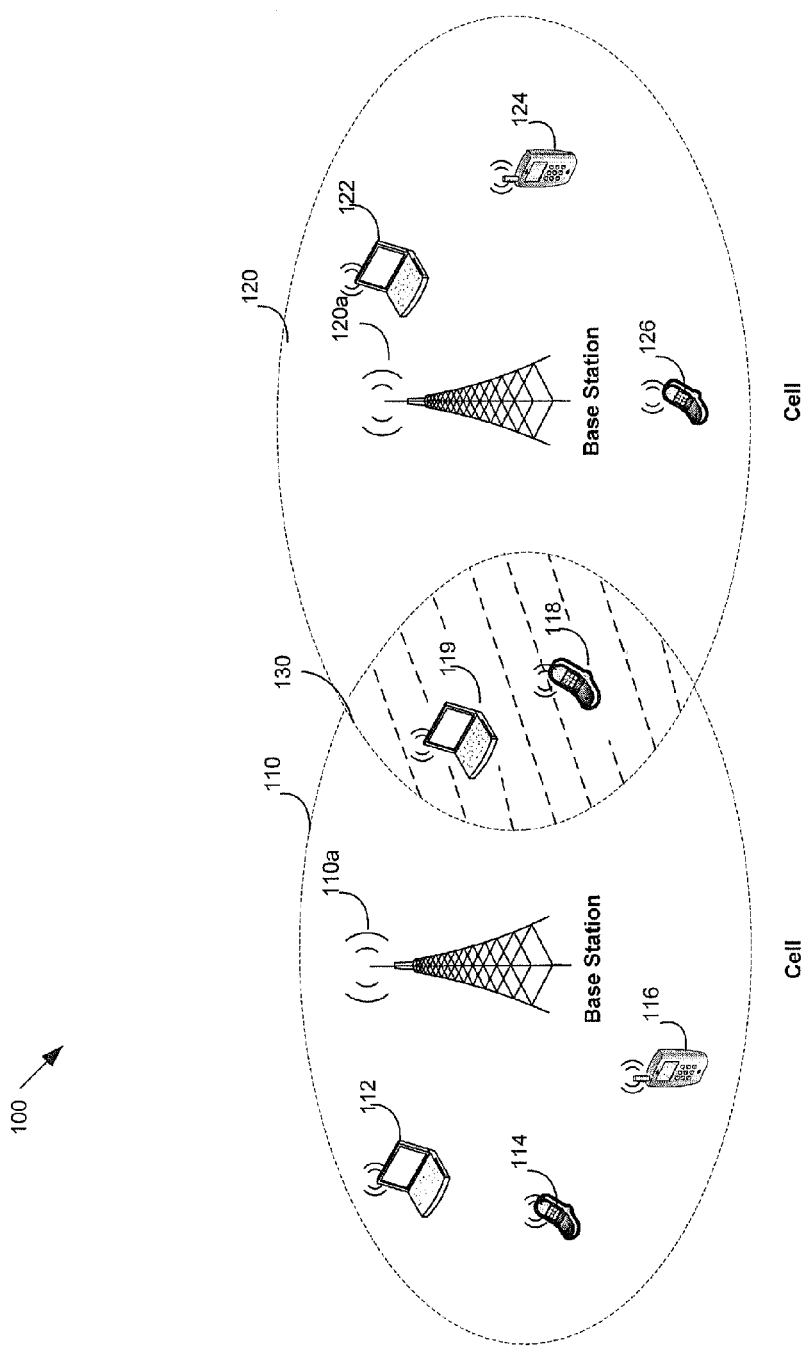
FIG. 1 is a diagram illustrating an exemplary LTE/E-UTRA communication system that is operable to utilize a reduced number of MFH branches to perform iterative multiple frequency hypothesis testing (MFHT) with Cell-ID detection in an E-UTRA/LTE UE receiver, in accordance with an embodiment of the invention.

FIG. 1 is a diagram illustrating an exemplary LTE/E-UTRA communication system that is operable to utilize a reduced number of MFH branches to perform iterative MFHT with Cell-ID detection in an E-UTRA/LTE UE receiver, in accordance with an embodiment of the invention. Referring to FIG. 1, there is shown a LTE/E-UTRA communication system 100. The LTE/E-UTRA communication system 100 comprises a plurality of cells, of which cells 110-120 are displayed. A LTE/E-UTRA coverage area 130 is the overlapped coverage area of the cell 110 and the cell 120. The cell 110 and the cell 120 are associated with a base station 110a and a base station 120a, respectively. The LTE/E-UTRA communication system 100 comprises a plurality of mobile devices, of which mobile devices 110-126 are illustrated. The mobile devices 112-116 are shown located in the cell 110. The mobile devices 122-126 are shown located in the cell 120. The mobile device 118 and the mobile device 119 are shown located in the overlapped LTE/E-UTRA coverage area 130.

A base station such as the base station 110a may comprise suitable logic, circuitry, interfaces and/or code that are operable to manage various aspects of communication, for example, communication connection establishment, connection maintenance and/or connection termination, with associated mobile devices within the cell 110. The base station 110a may be operable to manage associated radio resources such as, for example, radio bearer control, radio admission control, connection mobility control, and/or dynamic allocation of radio resources within the cell 110 in both uplink and downlink communication. The base station 110a may be operable to utilize physical channels and physical signals for communications in both the uplink and the downlink communication. The physical channels may carry information from higher layers to communicate user data as well as user control information. The physical signals such as synchronization signals may not carry information from higher layers. In the LTE/E-UTRA standard, the base station 110a may be operable to transmit a primary synchronization signal (PSS) and a secondary synchronization signal (SSS).

The base station 110a may be operable to transmit the PSS and the SSS on a per 5 ms basis, in the last two OFDM symbols of the first and eleventh slot in each radio frame. The PSS is chosen from a variety of Zadhoff-Chu sequences, carrying the information of the identity of the base station or cell within a cell group. The SSS is a sequence carrying the information about the cell group, encoded with a scrambling sequence, which is unique to an associated mobile device. The scrambling code may be linked or mapped to, for example, the index of the PSS. After successful time and frequency synchronization via the PSS synchronization, the frame boundary synchronization and/or the cell identification may be performed via SSS detection. The transmission of the PSS and the SSS may allow timing and frequency offset issues to be resolved before cell-specific information may be determined. This may reduce complexity in initial cell search and/or handover modes for associated mobile devices such as the mobile device 114 and the mobile device 118.

A mobile device such as the mobile device 118 may comprise suitable logic, circuitry, interfaces and/or code that may be operable to communicate with a base station such as the base station 110a for services supported, for example, in the LTE/E-UTRA standard. To communicate with the base station 110a, the mobile device 118 may be operable to determine one or more transmission parameters used by base station 110a. Such information may be obtained by, for example, decoding a Broadcast Channel (BCH) signal from the base station 110a. To that end, the mobile device 118 may need to synchronize to corresponding symbol timing and frame timing of transmissions from the base station 110a so as to acquire cell-specific parameters such as, for example, associated cell ID and/or antenna configuration. In this regard, the mobile device 118 may be operable to receive a plurality of PSSs and SSSs every 5 ms from neighbor or surrounding base stations such as the base station 110a and the base station 120a. The received plurality of PSSs is base station or cell specific.

The mobile device 118 may be operable to detect or select a particular PSS from the received plurality of PSSs to acquire PSS synchronization. The detected PSS may be used to estimate a channel. The resulting channel estimates may be utilized to decode or detect the associated SSS for frame boundary synchronization and cell group information identification. Various methods may be used by the mobile device 118 to detect or select the particular PSS out of the received plurality of PSSs. For example, the mobile device 118 may be operable to generate a plurality of correlation reference sequences (reference PSSs) each to correlate or match with the received plurality of PSSs, respectively. PSS correlation data may be accumulated in one or several time slot durations, for example. Resulting correlation peaks may indicate possible PSS symbol timing hypotheses under consideration. The mobile device 118 may be operable to detect the particular PSS according to the resulting correlation peaks. Furthermore, the mobile device 118 may be operable to utilize the PSS correlation data to estimate frequency offset associated with the particular PSS. Due to, for example, propagation delay, Doppler shift, and/or oscillator drift, there may be a wide range of uncertainty regarding the correct PSS symbol timing and/or correct local oscillator frequency for the receiver.

The uncertainties in the correct PSS symbol timing and frequency offset for the local oscillator may cause the mobile device 118 to fail to detect the particular PSS when present, erroneously detect the particular PSS when none may be present, or detect the particular PSS but fail to estimate the correct PSS symbol timing and/or local oscillator frequency offset, thereby losing data. In this regard, the mobile device 118 may be operable to perform multiple frequency hypotheses testing (MFHT) for frequency offset estimation. A set of initial frequency offsets may be selected within a frequency offset estimation range, namely, a local oscillator frequency uncertainty range, for example, +/−15 ppm, to evenly or unevenly, depending on the statistics of receiver local oscillator signal frequency offset, cover or span the frequency offset estimation range. One initial frequency offset may be applied to or placed in each multiple frequency hypothesis (MFH) branch in the multiple frequency hypothesis testing. The actual frequency of the applied initial frequency offsets may be determined based on the frequency offset estimation range, a desired frequency estimation resolution and available resources such as memory and/or available mixers within the mobile device 118 during the initial phase of synchronization/signal acquisition. In this regard, the mobile device 118 may be configured to utilize a reduced number of MFH branches, for example, three MFH branches, to perform or maintain multiple frequency hypotheses testing (MFHT).

U.S. application Ser. No. 12/721,979 filed on Mar. 11, 2010 provides detailed descriptions that three MFH branches may be utilized to iteratively perform MFHT, and is hereby incorporated herein by reference in its entirety. In this regard, an iteration of an iterative MFHT may start with three initial frequency offsets that span a frequency offset estimation range that is assigned or utilized for the iteration. Depending on the statistics of receiver local oscillator signal frequency offset, the three initial frequency offsets may evenly or unevenly span the frequency offset estimation range assigned for the iteration. Each of the three initial frequency offsets may be applied or placed in one of the three MFH branches, respectively. In other words, each MFH branch may be assigned a different initial frequency offset. Frequency offset estimation is performed successively over each of the three MFH branches. A frequency offset estimate for the current iteration may be determined based on a maximum MFH output from the three MFH branches. The determined frequency offset estimate may be fed back to adjust a receiver local oscillator signal frequency for the mobile device 118.

At the end of the current iteration, the frequency offset estimation range for the current iteration may be adjusted to prepare for the next iteration. For example, the frequency offset estimation range utilized for the current iteration may be reduced by a factor, given by the number of hypotheses used, three in this exemplary embodiment of the invention discussed, by appropriately adjusting the MFH branch mixing signal frequencies for the mobile device 118. The resulting adjusted frequency offset estimation range may be applied to the next iteration. Within the iterative MFHT, a receiver local oscillator frequency offset may be reduced on each successive iteration. Iterations of the iterative MFHT may continue until a frequency offset estimate falls within a pre-determined frequency offset range or a frequency pull-in range. In this regard, the resulting frequency offset may be managed or controlled through an Automatic Frequency Control (AFC) system. The number of iterations in the iterative MFHT may be determined based on the frequency acquisition range or the frequency pull-in range of such an AFC system.

In various embodiments of the invention, at each iteration of the iterative MFHT, the mobile device 118 may be configured to perform or implement Cell-ID detection in each MFH branch. For example, for a current iteration of the iterative MFHT, a signal for a received particular PSS may be frequency offset successively over the three MFH branches. Signal frequency offsetting may be achieved via frequency mixing. A PSS correlation process may be performed in each MFH branch after the frequency mixing. Resulting PSS correlation data may be accumulated over one or multiple time slots, for example. PSS correlation peaks (possible PSS symbol timing hypotheses) may be compared on the basis of correlation peak magnitudes so as to select a candidate PSS in each MFH branch for the received PSS. The candidate PSS in each MFH branch may be selected or determined at the current iteration based on the maximum correlation peak magnitude in corresponding MFH branches. The selected candidate PSSs may be used to estimate a channel in each MFH branch at the current iteration. The resulting channel estimates may be utilized to decode or detect a candidate SSS in each MFH branch in order to determine frame boundary synchronization, cell group information identification, and/or cyclic prefix (CP) length.

A full synch acquisition process may be performed in each MFH branch at each iteration of the iterative MFHT. More specifically, in each MFH branch, by the time a decision is made about receiver local oscillator signal frequency offset, cell-specific information such as Cell-ID and/or CP length may also be available. In this regard, successive frequency hypothesis testing and Cell-ID detection may be concurrently performed at each iteration of the iterative MFHT. A consistency check on a detected Cell-ID may be performed not only within one particular iteration, that is, checking the consistency of cell ID information between the first and second halves of a radio frame, but also from iteration to iteration so as to declare a Cell-ID for a serving cell. For example, in instances where a Cell-ID is not consistently detected in a MFH branch producing a maximum correlation magnitude within a particular iteration, the detected Cell-ID may be discarded. In instances where the Cell-ID is consistently detected over successive detection attempts in each MFH branch within a particular iteration, the detected specific Cell-ID may be retained for additional consistency check such as, for example, a consistency check from iteration to iteration. The Cell-ID may be declared for the serving cell if a consistent check for the Cell-ID is achieved, not only within a particular iteration, but also from iteration to iteration. The number of iterations required for performing a successful Cell-ID detection may largely be determined based on, for example, initial frequency offset setting and Signal-to-Noise ratio. By combining the iterative MFHT with Cell ID detection, the amount of hardware required to perform MFHT may be limited or reduced. Moreover, the amount of time required for determining or declaring a Cell-ID for the serving cell may also be reduced and/or minimized.

The mobile device 118 may be operable to utilize information that comes from the iterative MFHT with Cell ID detection to start camping on a declared serving cell. The consistency of the corresponding cell-specific information such as cell ID and/or CP length over successive detection attempts in each selected MFH branch may be taken into account when applying frequency estimates from the selected MFH branch for frequency control.

In an exemplary operation, the base station 110a may be operable to perform communications within the cell 110 using physical channels and physical signals such as a PSS and a SSS. The base station 110a may be operable to transmit base station specific PSS and SSS, regularly, for example, every 5 ms. To communicate with the base station 110a, a mobile device such as the mobile device 118 may be operable to acquire the PSS and SSS received from the base station 110a so as to determine one or more transmission parameters. For example, the mobile device 118 may be operable to acquire PSS synchronization to identify the PSS symbol timing and estimate a channel. The resulting channel estimates and the identified PSS symbol timing may be used to detect the received SSS for cell specific parameters such as frame boundary synchronization and/or cell group information.

A high resolution MFHT that utilizes a limited amount of memory and hardware such as mixers may be provided. The mobile device 118 may be operable to perform an iterative MFHT utilizing a reduced number of MFH branches to acquire PSS symbol timing and estimate receiver local oscillator signal frequency offset. For example, three MFH branches are utilized to maintain the MFHT for frequency acquisition. In this regard, the mobile device 118 may start an iteration of the iterative MFHT with a set of three initial frequency offsets. The set of three initial frequency offsets may be selected so that they evenly or unevenly span, depending on the statistics of receiver local oscillator signal frequency offset, over a frequency offset estimation range such as, for example, +/−15 ppm, utilized for the iteration. The mobile device 118 may be operable to assign or place the three initial frequency offsets to the three MFH branches, respectively. In each MFH branch, a baseband signal of a received PSS may be frequency offset by a corresponding initial frequency offset assigned by means of a mixer.

A PSS correlation process may be performed on the resulting baseband signal to acquire the received PSS. A candidate PSS for the received PSS may be selected according to resulting PSS correlation peak magnitudes. The selected candidate PSS may be utilized to decode or detect a candidate SSS for frame boundary synchronization, cell group information identification, and/or cyclic prefix (CP) length. A full synch acquisition may be performed in each MFH branch at the iteration. A particular MFH branch implied by the maximum PSS correlation peak magnitude over the three MFH branches may be selected. A frequency offset estimate may be determined at the iteration based on the selected particular MFH branch. The mobile device 118 may be operable to feed back the determined frequency offset estimate to adjust a receiver local oscillator signal frequency applied to the mobile device 118. The frequency offset estimation range utilized at the iteration may be reduced by a factor, given by the number of hypotheses used, for example, and applied to the next iteration. In instances where cell specific information such as Cell-ID for a serving cell is required, the mobile device 118 may be operable to concurrently perform successive frequency hypothesis testing over the three MFH branches and Cell-ID detection at the end of each iteration of the iterative MFHT. The consistency of a detected Cell-ID may be checked not only within a particular iteration, but also from iteration to iteration. A Cell-ID may be declared for a serving cell if the Cell-ID is consistently detected not only within a particular iteration, that is, checking the consistency of cell ID information between the first and second halves of a radio frame, but also from iteration to iteration. The mobile device 118 may utilize information from the iterative MFHT with Cell ID detection to start camping on a declared serving cell.

Figure 2:
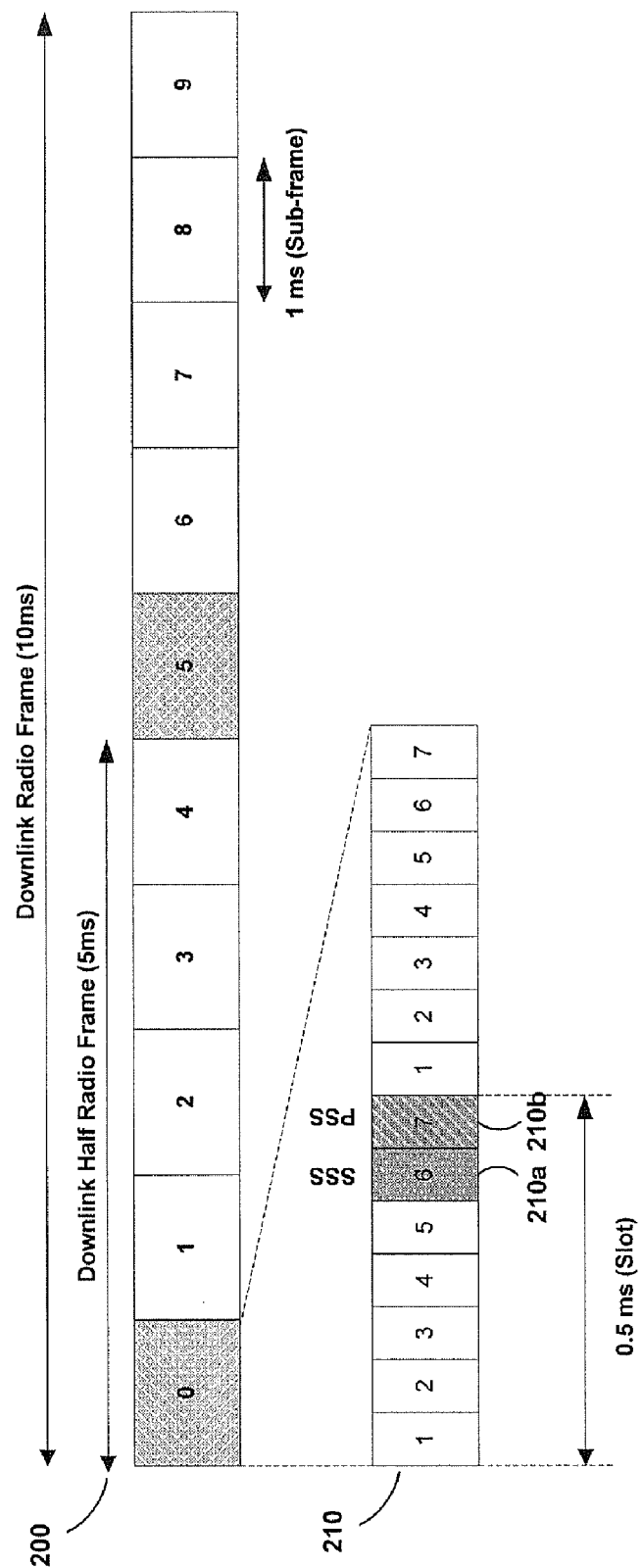
FIG. 2 is a block diagram of an exemplary E-UTRA/LTE downlink synchronization signal structure, which is utilized in accordance with an embodiment of the invention.

FIG. 2 is a block diagram of an exemplary E-UTRA/LTE downlink synchronization signal structure, which is utilized in accordance with an embodiment of the invention. Referring to FIG. 2, there is shown a downlink radio frame 200. In the LTE/E-UTRA standard, the downlink radio frame 200 may be divided into twenty equally sized slots with two contiguous slots arranged into a sub-frame such as the sub-frame 210. Downlink synchronization signals such as a PSS 210a and a SSS 210b may be transmitted from a base station such as, for example, the base station 110a and/or the base station 110b, to associated mobile devices such as the mobile device 118 so that the mobile device 118 may obtain correct timing for the downlink radio frame 200 and acquire cell-specific parameters such as, for example, associated Cell-ID and/or antenna configuration.

The PSS 210a and the SSS 210b may be transmitted on sub-frame 0 and 5 of the downlink radio frame 200 and occupy two consecutive symbols in a corresponding sub-frame. The PSS 210a may be used to identify the symbol timing and the Cell-ID within a cell ID group. The SSS 210b may be used for identifying frame boundary, detecting cell ID group, and/or acquiring system parameters such as cyclic prefix (CP) length. The SSS detection for the SSS 210b may start after a successful PSS synchronization on the PSS 210a. The PSS synchronization may provide timing and frequency offset information for the downlink radio frame 200. To acquire accurate timing and frequency offset with limited resources, an iterative MFHT with Cell-ID detection may be performed for the downlink radio frame 200. At each iteration of the iterative MFHT, a PSS correlation process for the PSS 210a may be combined in each MFH branch with frequency offset estimation. The SSS 210b may be detected in each MFH after the detection of the PSS 210a for cell-specific parameters such as, for example, Cell-ID and/or cyclic prefix (CP) length.

Figure 3:
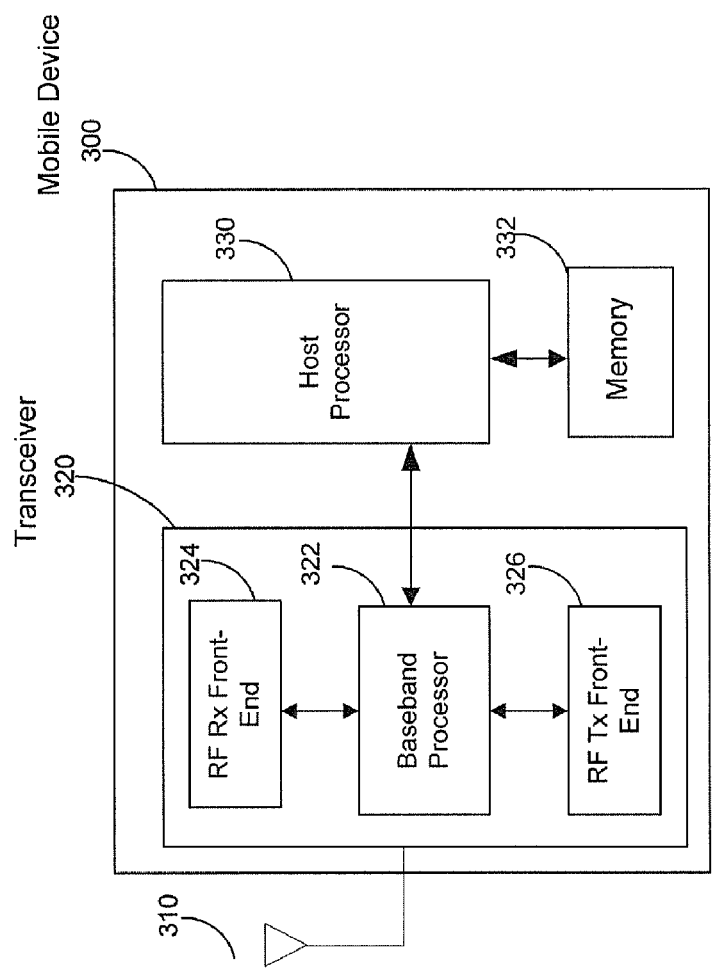
FIG. 3 is a block diagram of an exemplary mobile device that may be operable to utilize a reduced number of MFH branches to perform iterative MFHT with Cell-ID detection in an E-UTRA/LTE UE receiver, in accordance with an embodiment of the invention.

FIG. 3 is a block diagram of an exemplary mobile device that may be operable to utilize a reduced number of MFH branches to perform iterative MFHT with Cell-ID detection in an E-UTRA/LTE UE receiver, in accordance with an embodiment of the invention. Referring to FIG. 3, there is shown a mobile device 300 comprising an antenna 310, a transceiver 320, a host processor 330 and a memory 332. The transceiver 320 comprises a radio frequency (RF) receiver (Rx) front-end 324, a radio frequency (RF) transmitter (Tx) front-end 326 and a baseband processor 322.

The antenna 310 may comprise suitable logic, circuitry, interfaces and/or code that may be suitable for transmitting and/or receiving electromagnetic signals. Although a single antenna is illustrated, the invention is not so limited. In this regard, the transceiver 320 may be operable to utilize a common antenna for transmission and reception of radio frequency (RF) signals adhering to one or more wireless standards, may utilize different antennas for each supported wireless standard, and/or may utilize a plurality of antennas for each supported wireless standard. Various multi-antenna configurations may be utilized to take advantage of smart antenna technologies, diversity and/or beamforming, for example.

The transceiver 320 may comprise suitable logic, circuitry, interfaces and/or code that may be operable to transmit and/or receive RF signals adhering to one or more wireless standards such as the LTE/E-UTRA standard.

The RF Rx front-end 324 may comprise suitable logic, circuitry, interfaces and/or code that may be operable to process RF signals received, for example, over a LTE/E-UTRA air interface, via the antenna 310. The RF Rx front-end 324 may be operable to convert the received RF signals to corresponding baseband signals. The resulting baseband signals may be communicated with the baseband processor 322 for further baseband processing.

The RF Tx front-end 326 may comprise suitable logic, circuitry, interfaces and/or code that may be operable to process RF signals for transmission. The RF Tx front-end 326 may be operable to receive baseband signals from the baseband processor 128 and convert the baseband signals to corresponding RF signals for transmission via the antenna 310.

The baseband processor 322 may comprise suitable logic, circuitry, interfaces and/or code that may be operable to manage and/or control operations of the RF Rx front-end 324 and the RF Tx front-end 326, respectively. The baseband processor 322 may be operable to communicate baseband signals with the transceiver 320. The baseband processor 322 may be operable to handle baseband signals to be transferred to the RF Tx front-end 326 for transmission and/or process baseband signals from the RF Rx front-end 224. The received baseband signals may comprise synchronization signals such as a PSS and a SSS. The received PSS and SSS may be utilized to acquire transmission timing and other cell-specific parameters such as, for example, associated cell ID and/or antenna configuration used in an associated cell. In this regard, the baseband processor 322 may be operable to generate a plurality of correlation reference sequences (reference PSSs) for acquiring correct PSS timing and/or frequency offset.

Various factors such as, for example, propagation delay, Doppler shift, and/or oscillator drift, may cause a wide range of uncertainties on the correct PSS symbol timing and/or local oscillator frequency offset. In this regard, the baseband processor 322 may be operable to perform an iterative MFHT for accurate PSS symbol timing and/or local oscillator frequency offset estimation. The baseband processor 322 may be configured to utilize a reduced number of MFH branches, for example, three MFH branches, to implement or maintain the MFHT for frequency acquisition. In this regard, the baseband processor 322 may be operable to start an iteration of the iterative MFHT with a set of three initial frequency offsets. The three initial frequency offsets may selected such that they evenly or unevenly span, depending on the statistics of receiver local oscillator signal frequency offset, over a frequency offset estimation range such as, for example, +/−15 ppm, applied to the current iteration. Each of the three initial frequency offsets may be initially applied or assigned to only one the three MFH branches, respectively. In each of the three MFH branches, the baseband processor 322 may be operable to apply a corresponding initial frequency offset to the received baseband signal. The baseband processor 322 may be operable to perform a PSS correlation process on each of the signals with a different initial frequency offset. A candidate PSS for the received PSS may be selected from one of the MFH branches at the current iteration based on resulting PSS correlation peak magnitudes.

The selected candidate PSS may be used to decode or detect a candidate SSS per MFH branch at the current iteration. For example, in each MFH branch, a PSS specific scrambling code may be identified for the SSS processing. Also, the selected candidate PSS may be used to estimate a channel. The resulting channel estimates may be utilized to decode or detect a candidate SSS per MFH branch for frame boundary synchronization, cell group information identification, and/or cyclic prefix (CP) length. The baseband processor 322 may be operable to select a particular MFH branch implied by the highest PSS correlation peak magnitude over all the three MFH branches. A frequency offset estimate may be determined at the current iteration based on the selected particular MFH branch. The baseband processor 322 may be operable to feed back the determined frequency offset estimate to adjust the receiver local oscillator signal frequency utilized for communications on the mobile device 300. At the end of the current iteration, the baseband processor 322 may be operable to reduce the frequency offset estimation range utilized for the current iteration by a factor so as to prepare for the next iteration. The factor may be determined or given by the number of hypotheses used, three in this exemplary embodiment of the invention discussed. In instances where cell specific information such as Cell-ID for a serving cell is required, the baseband processor 322 may be operable to concurrently perform successive frequency hypothesis testing over the three MFH branches and perform Cell-ID detection at each iteration of the iterative MFHT. The baseband processor 322 may be operable to perform consistency check on a detected Cell-ID not only within a particular iteration, but also from iteration to iteration. A Cell-ID may be declared for a serving cell if the Cell-ID is consistently detected not only within a particular iteration, that is checking the consistency of cell ID information between the first and second halves of a radio frame, but also from iteration to iteration. The baseband processor 322 may be operable to utilize information from the iterative MFHT with Cell ID detection to start camping on a declared serving cell.

The host processor 330 may comprise suitable logic, circuitry, interfaces and/or code that may be operable to manipulate and control operation of the transceiver 320. The host processor 330 may be operable to communicate data with the transceiver 320 to support applications such as, for example, audio streaming on the mobile device 300.

The memory 332 may comprise suitable logic, circuitry, and/or code that may enable storage of information such as executable instructions and data that may be utilized by the host processor 330 as well as the baseband processor 322. The executable instructions may comprise algorithms that may be applied to various baseband signal processes such as synchronization and/or channel estimation. The memory 332 may comprise RAM, ROM, low latency nonvolatile memory such as flash memory and/or other suitable electronic data storage.

In an exemplary operation, the RF Rx front-end 324 may be operable to process RF signals received via the antenna 310 over the LTE/E-UTRA air interface, for example. The received RF signals may comprise PSSs and SSSs transmitted by base stations such as the base station 110a and/or the base station 120a. The received RF signals may be converted to corresponding baseband signals and communicated with the baseband processor 322 for further baseband processing. To communicate with a particular base station such as the base station 110a, the baseband processor 322 may be operable to synchronize to cell specific transmission timing such as, for example, the symbol timing and frame boundary used by the base station 110a. In this regard, the baseband processor 322 may be operable to generate a plurality of correlation reference sequences (reference PSSs) for acquiring PSS synchronization. To acquire accurate PSS symbol timing and/or frequency offset utilizing limited resources, the baseband processor 322 may be operable to perform an iterative MFHT utilizing the reduced number of MFH branches, for example, three MFH branches. In this regard, an iteration of the iterative MFHT may start with a set of three initial frequency offsets that are selected so that they evenly or unevenly span a frequency offset estimation range such as, for example, +/−15 ppm. The baseband processor 322 may be operable to assign the three initial frequency offsets to only one of the three MFH branches, respectively. A baseband signal associated with the received PSS may be frequency offset via frequency mixing. A PSS correlation process may be performed per MFH branch after frequency mixing.

A candidate PSS for the received PSS may be selected in each MFH branch at the current iteration according to corresponding resulting PSS correlation peak magnitudes. In each MFH branch, the baseband processor 322 may be operable to utilize the selected candidate PSS to estimate a channel for decoding or detecting a candidate SSS. Cell-specific information such as, for example, Cell-ID and/or CP length, may be acquired in each MFH branch from the corresponding decoded candidate SSS. A particular MFH branch implied by the highest PSS correlation peak magnitude may be selected over the three MFH branches. A frequency offset estimate may be determined at the current iteration from the selected particular MFH branch. The determined frequency offset estimate may be fed back to adjust a receiver local oscillator signal frequency utilized by the mobile device 300. The frequency offset estimation range utilized at the current iteration may be reduced for the next iteration. For example, the frequency offset estimation range utilized at the current iteration may be reduced by a factor, given by the number of hypotheses used, three in this exemplary embodiment of the invention discussed, by appropriately adjusting each of the frequency offsets applied to each of the MFH branches for the mobile device 300. In instances where cell specific information such as Cell-ID for a serving cell is needed, successive frequency hypothesis testing over the three MFH branches and Cell-ID detection may be concurrently performed at each iteration. A consistency check on a detected Cell-ID may be performed not only within a particular iteration, but also from iteration to iteration. A Cell-ID for a serving cell may be declared if the Cell-ID is consistently detected not only within a particular iteration, that is, checking the consistency of cell ID information between the first and second halves of a radio frame, but also across iterations. Information provided by the iterative MFHT with Cell ID detection may be utilized by the mobile device 300 to start camping on a declared serving cell.

Figure 4:
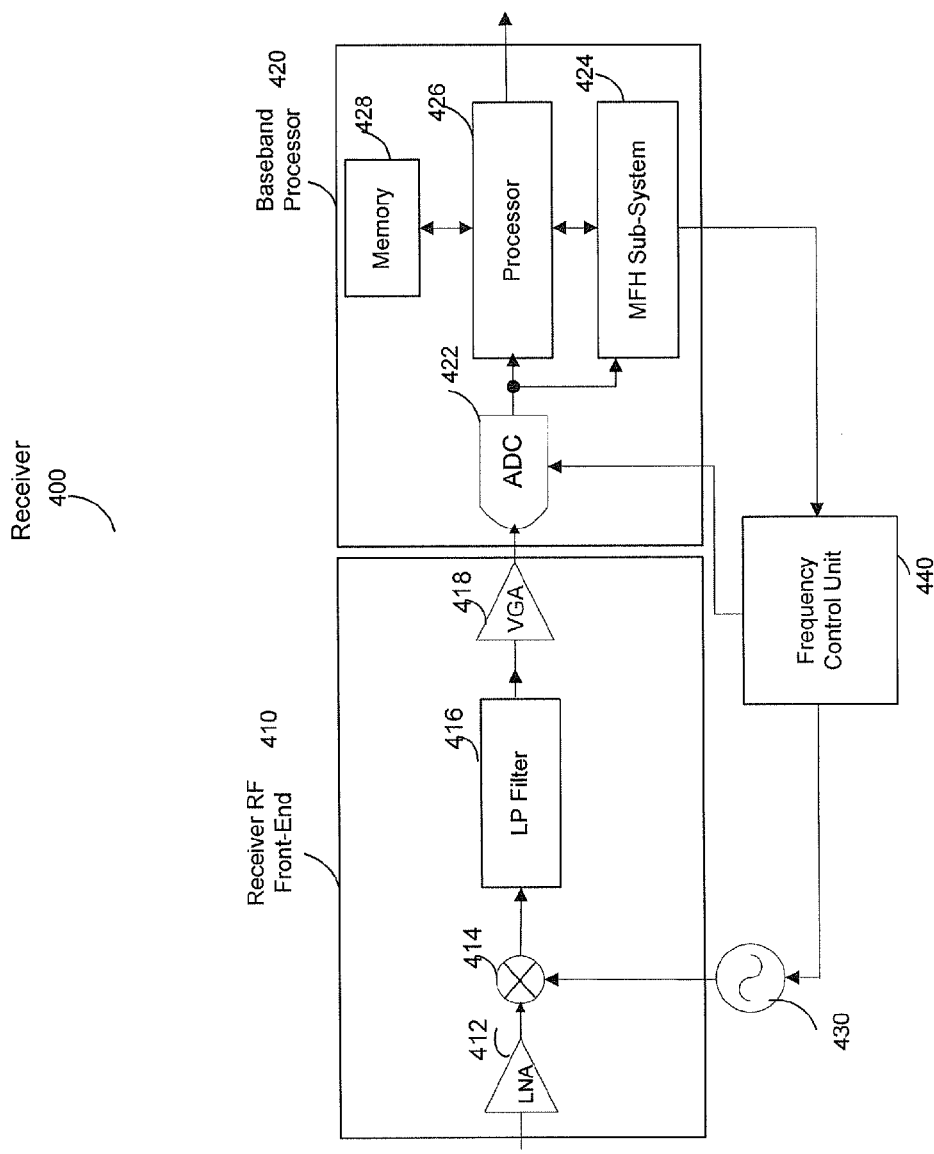
FIG. 4 is a block diagram illustrating an exemplary receiver that is operable to utilize a reduced number of MFH branches to perform iterative MFHT with Cell-ID detection, in accordance with an embodiment of the invention.

FIG. 4 is a block diagram illustrating an exemplary receiver that is operable to utilize a reduced number of MFH branches to perform iterative MFHT with Cell-ID detection, in accordance with an embodiment of the invention. Referring to FIG. 4, there is shown a receiver 400. The receiver 400 comprises a receiver radio frequency (RF) front-end 410, a baseband processor 420, a local oscillator 430 and a frequency control unit 440. The receiver RF front-end 410 comprises a low noise amplifier (LNA) 412, a mixer 414, a low pass (LP) filter 416, and a variable-gain amplifier (VGA) 418. The baseband processor 420 comprises an analog-to-digital converter (ADC) 422, a multiple frequency hypothesis sub-system 424, a processor 426 and a memory 428.

The receiver RF front-end 410 may comprise suitable logic, circuitry, interfaces and/or code that may be operable to process a RF signal received via the antenna 310. The received RF signal may comprise a PSS and a SSS. The receiver RF front-end 410 may be operable to convert the received RF signal to a corresponding baseband frequency, which may be further processed by the baseband processor 420.

The LNA 412 may comprise suitable logic, circuitry, interfaces and/or code that may be operable to amplify a RF signal received by the antenna 310. The LNA 412 may be operable to essentially set a limit for how low a system noise figure may reach. The LNA 412 may be enabled to achieve a low noise performance, which is crucial for a high performance radio frequency (RF) front end.

The mixer 414 may comprise suitable logic, circuitry, interfaces and/or code that may be operable to translate the amplified RF signal from the LNA 412 to a lower, intermediate frequency (IF) signal using signals provided by a local oscillator 430, which is driven by a reference frequency provided by the frequency control unit 440.

The LP filter 416 may comprise suitable logic, circuitry, interfaces and/or code that may be operable to filter the IF signal from the mixer 414 so as to remove unwanted signal components. The LP filter 416 may be operable to convert the resulting IF signal to an analog baseband signal.

The VGA 418 may comprise suitable logic, circuitry, interfaces and/or code that may be operable to amplify the analog baseband signal from the LP filter 416. The VGA 418 may be operable to apply different gains to the analog baseband signal resulting in a variable signal level at the input to the ADC 422.

The ADC 422 may comprise suitable logic, circuitry, interfaces and/or code that may be operable to convert analog baseband signals received from the VGA 418 of the receiver RF front-end 410 to a corresponding digital baseband signal (e.g., digital samples). The ADC 422 may be operable to sample the received analog baseband signal at an analog-to-digital sampling rate of, for example, 30.72 MHz, which is derived from the reference frequency provided by the frequency control unit 440. The resulting digital baseband signal may comprise values that are representative of the analog baseband signal amplitudes. The digital baseband signal may be communicated with the MFH sub-system 424 for acquiring correct PSS timing and/or frequency offset. The digital baseband signal may be communicated with the processor 426 for other baseband processing such as the SSS detection.

The MFH sub-system 424 may comprise suitable logic, circuitry, interfaces and/or code that may be operable to perform iterative MFHT for accurate PSS timing and/or frequency offset estimation. The MFH sub-system 424 may utilize a reduced number of MFH branches to maintain or implement MFHT operations. In this regard, an iteration of the iterative MFHT may start with a set of, for example, three initial frequency offsets. The three initial frequency offsets may evenly or unevenly span, depending on the statistics of receiver local oscillator signal frequency offset, over a frequency offset estimation range such as, for example, +/−15 ppm, applied to the current iteration. The three initial frequency offsets may be applied to only one of the three MFH branches, respectively. In this regard, a first frequency offset may be applied to a first MFH branch, a second frequency offset may be applied to a second MFH branch, and a third frequency offset may be applied to a third MFH branch. In each MFH branch, the MFH sub-system 424 may be operable to apply a corresponding initial frequency offset to a baseband signal via frequency mixing. A PSS correlation process may be performed in each MFH branch subsequent to frequency mixing. The MFH sub-system 424 may be operable to select a candidate PSS for the received PSS in each MFH branch at the current iteration based on corresponding PSS correlation peak magnitudes.

The MFH sub-system 424 may be operable to perform the SSS detection or decoding at the current iteration in each MFH branch based on a corresponding selected candidate PSS associated with a particular branch. The MFH sub-system 424 may be operable to perform a full synch acquisition within each MFH branch at the current iteration. A particular MFH branch that is implied by the highest PSS correlation peak magnitude may be selected over the three MFH branches in the MFH sub-system 424.

A frequency offset estimate at the current iteration may be determined by the MFH sub-system 424 based on the selected particular MFH branch. The determined frequency offset estimate may be fed back to adjust the receiver local oscillator signal frequency utilized by the receiver 400. At the end of the current iteration, the MFH sub-system 424 may be configured to reduce the frequency offset estimation range utilized for the current iteration by a factor given by the number of hypotheses used, three in this exemplary embodiment of the invention discussed. The reduced frequency offset estimation range may be applied to the next iteration. In instances where cell specific information such as Cell-ID for a serving cell is required, the MFH sub-system 424 may be operable to concurrently implement successive frequency hypothesis testing over the three MFH branches and perform Cell-ID detection at each iteration of the iterative MFHT. A consistency check on a detected Cell-ID may be performed not only within a particular iteration, but also from iteration to iteration. In instances where a Cell-ID is consistently detected not only within a particular iteration, that is, checking the consistency of cell ID information between the first and second halves of a radio frame, but also from iteration to iteration, the MFH sub-system 424 may declare the Cell-ID for a serving cell. The MFH sub-system 424 may be operable to communicate information that is derived from the iterative MFHT with Cell ID detection to the processor 426 to start camping on a declared serving cell. The MFH sub-system 424 may continue iterations of the iterative MFHT until a frequency offset estimate within a desired frequency offset range is achieved. The number of iterations utilized in the iterative MFHT may be determined based, for example, on the frequency tracking range of an Automatic Frequency Control loop of the receiver 400.

The processor 426 may comprise suitable logic, circuitry, interfaces and/or code that may be operable to process digital baseband signals from the ADC 422. The processor 426 may be operable to perform various baseband procedures such as channel equalization using information from the MFH sub-system 424.

The memory 428 may comprise suitable logic, circuitry, interfaces and/or code that may enable storage of information such as executable instructions and data that may be utilized by associated device components such as the processor 426 in the receiver 400. The executable instructions may constitute algorithms that may be applied to various baseband procedures such as channel estimation, channel equalization, and/or channel coding. The data may comprise timing and/or frequency offset hypotheses. The memory 428 may comprise RAM, ROM, low latency nonvolatile memory such as flash memory and/or other suitable electronic data storage.

The local oscillator 430 may comprise suitable logic, circuitry, interfaces and/or code that may be operable to provide a mixing signal to the mixer 414 of the receiver 400. The local oscillator 430 may be operable to be adjustable in frequency on the basis of a reference signal provided by the frequency control unit 440 according to frequency offset estimates provided by the MFH sub-system 424.

The frequency control unit 440 may comprise suitable logic, circuitry, interfaces and/or code that may be operable to control the settings for the corresponding reference frequency of the local oscillator 430 and the ADC 422. The frequency control unit 440 may be operable to adjust the reference frequencies of the local oscillator 430 and the ADC 422, respectively, according to the frequency offset estimates from the MFH sub-system 424. The operation of the frequency control unit 440 may be operable to control the timing and/or the local oscillator signal frequency of the receiver 400.

In an exemplary operation, the receiver 400 may be operable to receive a RF signal from the antenna 310, for example. The received RF signal may comprise a PSS and a SSS. The receiver RF front-end 410 may be operable to amplify the received RF signal via the LNA 412 and convert it to a baseband signal via the mixer 414 and the LP filter 416, respectively. The baseband signal may be amplified via the VGA 418 and converted to a digital baseband signal via the ADC 422. The digital baseband signal may be processed by the MFH sub-system 424 for acquiring accurate PSS timing and/or frequency offset estimates. The MFH sub-system 424 may be operable to utilize, for example, three MFH branches, to implement an iterative MFHT. The iterative MFHT may start by applying each of the three initial frequency offsets to only one of the three MFH branches, respectively. In this regard, a first frequency offset may be applied to a first MFH branch, a second frequency offset may be applied to a second MFH branch, and a third frequency offset may be applied to a third MFH branch. The three initial frequency offsets may evenly or unevenly span, depending on the statistics of receiver local oscillator signal frequency offset, over a frequency offset estimation range utilized for the current iteration. In each MFH branch, the MFH sub-system 424 may be operable to apply a frequency offset to the digital baseband signal with a corresponding initial frequency offset in each MFH branch. A PSS correlation process may be performed in each MFH branch subsequent to applying the offset frequency to the digital baseband signal. A candidate PSS for the received PSS may be selected in each MFH branch at the current iteration based on corresponding PSS correlation peak magnitudes. A particular MFH branch corresponding to the highest PSS correlation peak magnitude may be selected over the three MFH branches at the current iteration.

A frequency offset estimate at the current iteration may be determined based on the selected particular MFH branch. The determined frequency offset estimate at the current iteration may be fed back to the frequency control unit 440. The frequency control unit 440 may be operable to adjust reference frequencies of the local oscillator 430 and/or the ADC 422 based on the determined frequency offset estimate from the MFH sub-system 424. In instances where the determined frequency offset estimate is within a frequency offset range utilized by the frequency control unit 440 for AFC operation, the MFH sub-system 424 may stop iterations of the iterative MFHT. The frequency control unit 440 may manage or control reference frequencies of the local oscillator 430 and/or the ADC 422 via AFC operation. Otherwise, the MFH sub-system 424 may continue iterations of the iterative MFHT. The current frequency offset estimation range may be reduced by a factor, given by the number of hypotheses used, for example, which is then to be utilized for the next iteration. Within each iteration, following the PSS correlation process, the MFH sub-system 424 may be operable to perform SSS detection for a full synch acquisition in each MFH branch. In this regard, the MFH sub-system 424 may be operable to concurrently implement successive frequency hypothesis testing over the three MFH branches and perform Cell-ID detection at each iteration. A detected Cell-ID may be checked for consistency within a particular iteration, that is, checking the consistency of cell ID information between the first and second halves of a radio frame, as well as from iteration to iteration. In instances where a Cell-ID is consistently detected not only within a particular iteration, but also from iteration to iteration, the MFH sub-system 424 may declare the Cell-ID for a serving cell. The processor 426 may be operable to utilize information from the MFH sub-system 424 to start camping on a declared serving cell.

Figure 4A:
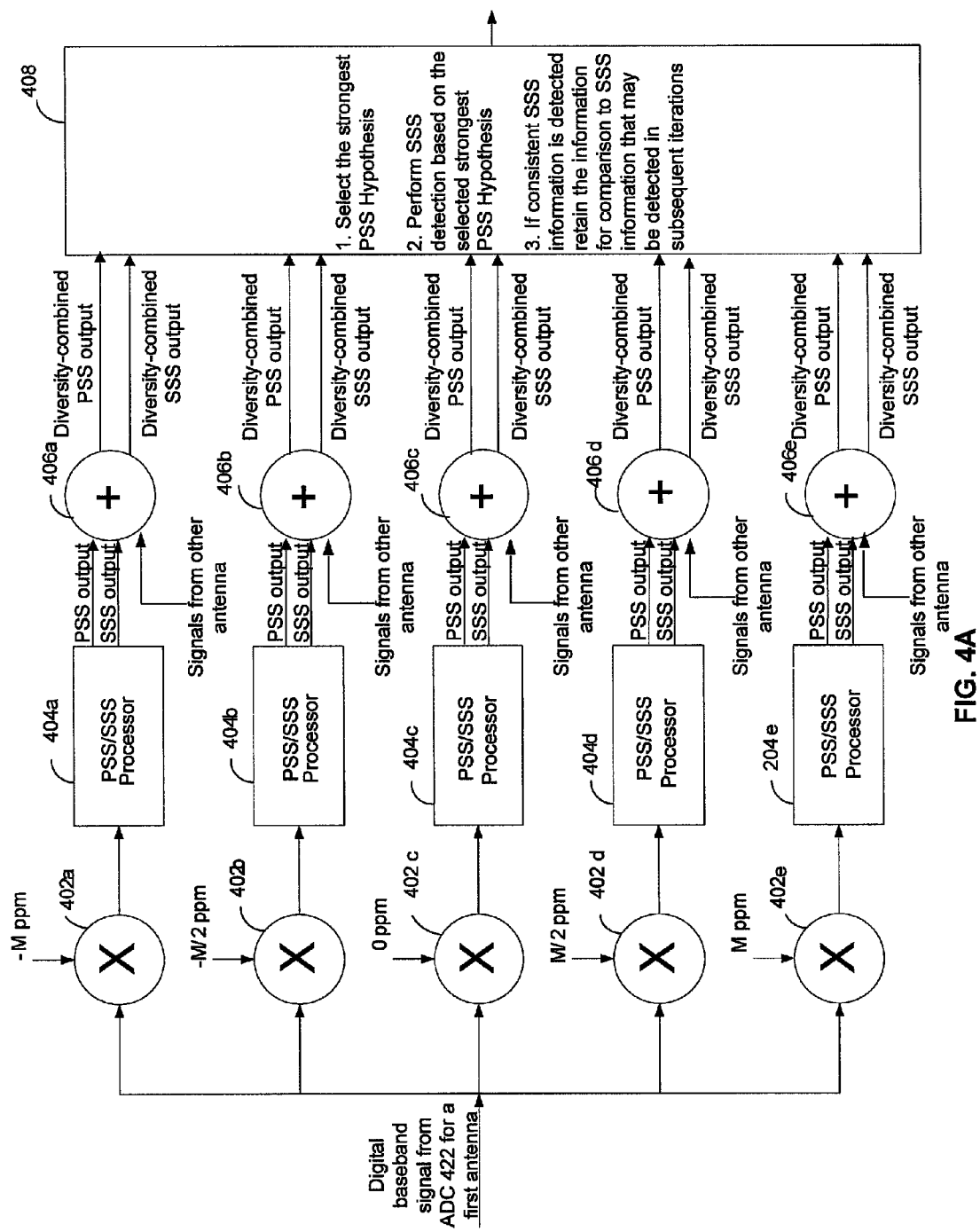
FIG. 4A is a diagram illustrating an exemplary multi-frequency hypothesis structure for frequency offset estimation, in connection with various embodiments of the invention.

FIG. 4A is a diagram illustrating an exemplary multi-hypothesis structure for frequency offset estimation, in connection with various embodiments of the invention. Referring to FIG. 4A, there is shown multipliers 402a, 402b, 402c, 402d, and 402e, Primary Synchronization Signal (PSS)/Secondary Synchronization Signal (SSS) processors 404a, 404b, 404c, 404d, and 404e, adders 406a, 406b, 406c, 406d, and 406e, and a MFH branch selector 408. There is also shown a digital baseband (BB) signal input from a first antenna, and a plurality of input signals from similar multi-hypotheses structures from possible other antennas, in the case of a multi-antenna system.

The multipliers 402a, 402b, 402c, 402d, and 402e may comprise suitable logic, circuitry, interfaces and/or code that may be operable to multiply a plurality of input signals, and generate an output signal that may be proportional to the product of the plurality of input signals. The PSS/SSS processors 404a, 404b, 404c, 404d, and 404e may comprise suitable logic, circuitry, interfaces and/or code that may be operable to generate a PSS output signal and a SSS output signal. The PSS output signal may be a correlation between one or more input signals and one or more locally generated reference primary synchronization signals. The SSS output signal may comprise decoded SSS information. The adders 406a, 406b, 406c, 406d, and 406e may comprise suitable logic, circuitry, interfaces and/or code that may be operable to generate an output signal that may be proportional to the sum of a plurality of input signals. In this regard, the adders 406a, 406b, 406c, 406d, and 406e may be operable to produce a diversity-combined PSS output signal and a diversity-combined SSS output signal in corresponding MFH branches.

The MFH branch selector 408 may comprise suitable logic, circuitry, interfaces and/or code that may be operable to generate an output signal that may correspond to one of a plurality of input signals, based on a decision metric computed from the plurality of input signals.

A frequency offset of a receiver local oscillator signal from a target frequency may be estimated through a plurality of hypothesis tests for a plurality of frequency offsets, as illustrated in FIG. 4A. For example, for a received baseband signal from a particular receiver antenna, it may be desirable to estimate a receiver local oscillator signal frequency offset. In this regard, the received baseband signal may be communicatively coupled to a plurality of multipliers, of which an exemplary embodiment with multipliers 402a, 402b, 402c, 402d, and 402e is illustrated. At a multiplier such as the multiplier 402a, the received baseband signal may be offset in frequency by a certain offset −M Hz, through suitable multiplication with an offset signal. For example, if the received baseband signal may be at frequency (x+d), where x may be a desired frequency without offset, and d may be the actual offset from frequency x in the received baseband signal, the output signal of multiplier 402a may be at a frequency (x+d−M). Similarly, the outputs of multipliers 402b, 402c, 402d and 402e may be at frequencies (x+d−M/2), (x+d), (x+d+M/2), (x+d+M), respectively. Thus, the multipliers 402a, 402b, 402c, 402d, and 402e may apply a set of offset frequencies to an input signal. For signals received at baseband, the desired frequency x may typically be x=0.

The outputs of the multipliers 402a, 402b, 402c, 402d, and 402e may be communicatively coupled to the PSS/SSS processors 404a, 404b, 404c, 404d, and 404e, respectively. At the PSS/SSS processors 404a, for example, the PSS output signal from the multiplier 402a may be correlated with a set of locally generated reference primary synchronization signals (PSSs). Typically, a higher correlation magnitude between a local reference PSS signal and the output signal of the multiplier 402a may indicate a lower offset between actual and desired local oscillator frequency at the receiver, which may be manifested by the output of the multiplier 402a. Thus, in accordance with various embodiments of the invention, a higher correlation PSS output magnitude of the PSS/SSS processor 404a may correspond to a small difference in frequency between an output signal of the multiplier 402a at frequency (d−M) and a reference PSS signal at baseband. Hence, a high correlation value may indicate that a certain offset M may compensate a certain offset d relatively well, that is, in the above example, d−M may be small. Similarly, the PSS/SSS processors 404b, 404c, 404d, and 404e may compare a reference PSS signal at baseband, with the correspondingly offset output of the multipliers 402b, 402c, 402d, and 404e, respectively.

In instances where multiple antenna systems may be utilized, for example in a MIMO system, the received baseband signals from each antenna may be processed similarly. For example, a second antenna signal may be offset in a multiplier similar to the multiplier 402a, and correlated with a reference PSS signal in a PSS correlation operation performed similar to the PSS/SSS processor 404a. In these instances, the plurality of PSS outputs corresponding to an offset for one or more antennas may be combined by the adders 406a, 406b, 406c, 406d, and 406e. For example, the PSS outputs from at least a second antenna may be combined with the PSS output of the PSS/SSS processor 404a for an offset −M, in the adder 406a, and, the SSS outputs from at least a second antenna may be combined with the SSS output of the PSS/SSS processor 404a for an offset −M, in the adder 406a, as illustrated in FIG. 4A.

To determine, the most appropriate frequency offset estimate, the MFH branch selector 408 may choose between the outputs of the adders 406a, 406b, 406c, 406d, and 406e, for example by choosing the frequency hypothesis test corresponding to the largest correlation value. That is, the MFH branch selector 408 may typically choose the output of the adders 406a, 406b, 406c, 406d, and 406e corresponding to the smallest difference |d+s|, where, for example, $$s \in \left\{-M, -\frac{M}{2}, 0, \frac{M}{2}, M\right\},$$

as illustrated in accordance with various embodiments in FIG. 4A. The output of the MFH branch selector 408 may indicate which output of the adders 406a, 406b, 406c, 406d, and 406e may have been selected, and thus provides a frequency offset estimate through the corresponding frequency offset applied in the multiplier associated with the selected adder output.

When the frequency offset d is limited to a certain finite range of frequencies, the resolution of the hypothesis testing as illustrated in FIG. 4A may depend on the number of different hypotheses that may be tested. As illustrated in FIG. 4A, an exemplary 5 hypotheses may be tested. Similarly, a higher accuracy may be obtained, for example, by using 9 hypothesis tests, whereby the difference |d+s|, may be computed from an exemplary set of offsets $$s \in \left\{-M, -\frac{3M}{4}, -\frac{M}{2}, -\frac{M}{4}, 0, \frac{M}{4}, \frac{M}{2}, \frac{3M}{4}, M\right\}.$$

The increased accuracy may lead to an increase in hypothesis testing hardware, similar to the one illustrated in FIG. 4A.

Figure 4B:
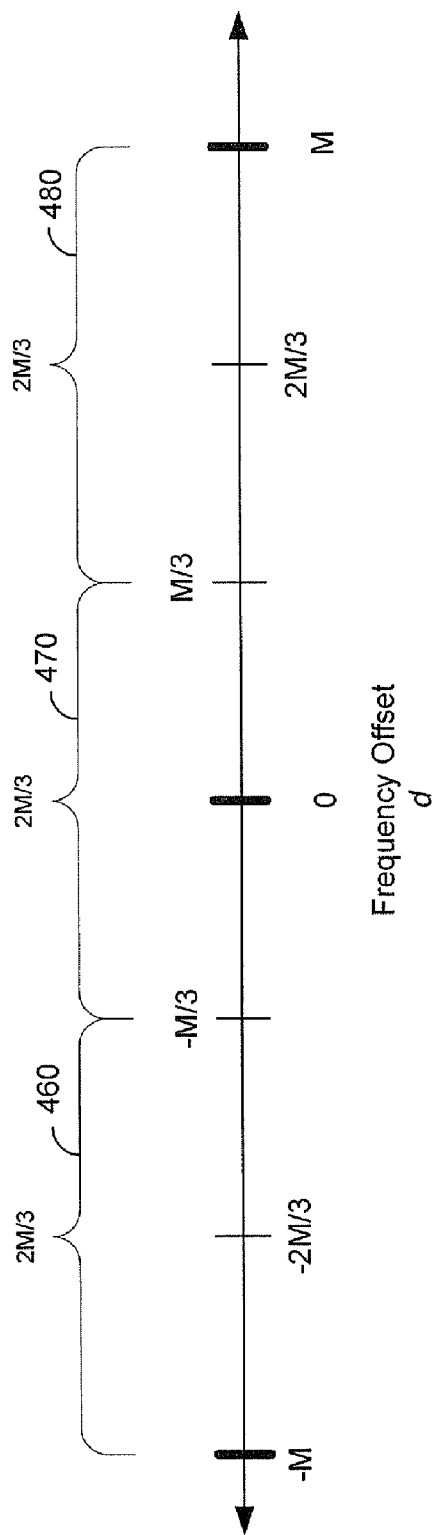
FIG. 4B is a diagram illustrating an exemplary frequency range of hypothesis intervals, in accordance with an embodiment of the invention.

FIG. 4B is a diagram illustrating an exemplary range of frequency hypothesis intervals, in accordance with an embodiment of the invention. Referring to FIG. 4B, there is shown a horizontal frequency offset axis, and 3 exemplary hypothesis test intervals 460, 470, and 480, respectively. There is also shown exemplary frequency offset markings at −M, −2M/3, −M/3, 0, M/3, 2M/3 and M Hz.

Due to the channel characteristics, the accuracy of components employed at the receiver, and/or the system design, it may be known in what range a frequency offset d from a target frequency x may be found. For example, it may be known that a frequency offset may be between a frequency offset $d \in \{-M, M\}$. Due to hardware constraints, for example, an exemplary 3 hypotheses may be tested against a received signal at frequency (x+d). In this case, the frequency offset range may be divided into 3 intervals, for example frequency offset intervals 460, 470, and 480. For efficiency, and depending on the statistics of the receiver local oscillator signal frequency offset, for example, equal-length frequency intervals may be utilized, although the invention is not limited in this regard. In instances where three intervals are utilized, as illustrated in FIG. 4B, this may lead to intervals of length 2M/3. It may furthermore be desirable to test for a hypothesis corresponding to a center value of a hypothesis interval. For example, if the frequency offset −d falls into the interval 480, an offset value that may be applied at, for example, a multiplier 402e may be the center value of interval 480, that is s=2M/3, which may lead to a smaller |d−s|, where $$s \in \left\{-\frac{2M}{3}, 0, \frac{2M}{3}\right\},$$

than any other value for s, corresponding to another hypothesis. A smaller value of |d−s| may lead to a larger PSS correlation output at the output of, for example, the PSS/SSS processor 404e, corresponding to the associated frequency offset. Thus, for an exemplary −d in the frequency offset interval 480, an associated PSS output may return a larger value, and hence the frequency offset |d−s| may be assumed to be smallest for a chosen offset value s=2M/3.

As may be seen from FIG. 4B, for a given finite frequency offset range of $d \in \{-M, M\}$, a higher estimation accuracy of a frequency offset may be achieved by a larger number of hypothesis tests, that is, smaller hypothesis intervals. Since the use of more hypotheses tests may require more hardware, a trade-off between the number of hypotheses (and associated hardware complexity) and the estimation accuracy may have to be made. It may thus be desirable to achieve higher accuracy, without increasing the hypothesis testing hardware.

Higher accuracy, in accordance with various embodiments of the invention, for similar hardware complexity, may be achieved through an iterative process that may successively estimate local oscillator frequency offset, and feed it back to adjust the local oscillator frequency. The multi-frequency hypothesis (MFH) grid that may be illustrated in FIG. 4B, may then be shortened by an exemplary factor of 3, and the residual frequency offset may be re-estimated using the narrower spaced MFH grid. The re-estimation may be based on, for example, the PSS correlation magnitude as an indicator of a desirable estimate of frequency offset. On each successive iteration, the process may be repeated and the frequency offset may be further reduced with the iterative process terminated when the residual frequency offset may be within an acceptable margin of error. In these instances, the accuracy may depend on the number of iterations. In this case, although comparatively little extra hardware may be required, additional processing time may be needed. An iterative process may be achieved, in accordance with various embodiments of the invention, via programmable interval boundaries, and programmable hypothesis tests.

Figure 5:
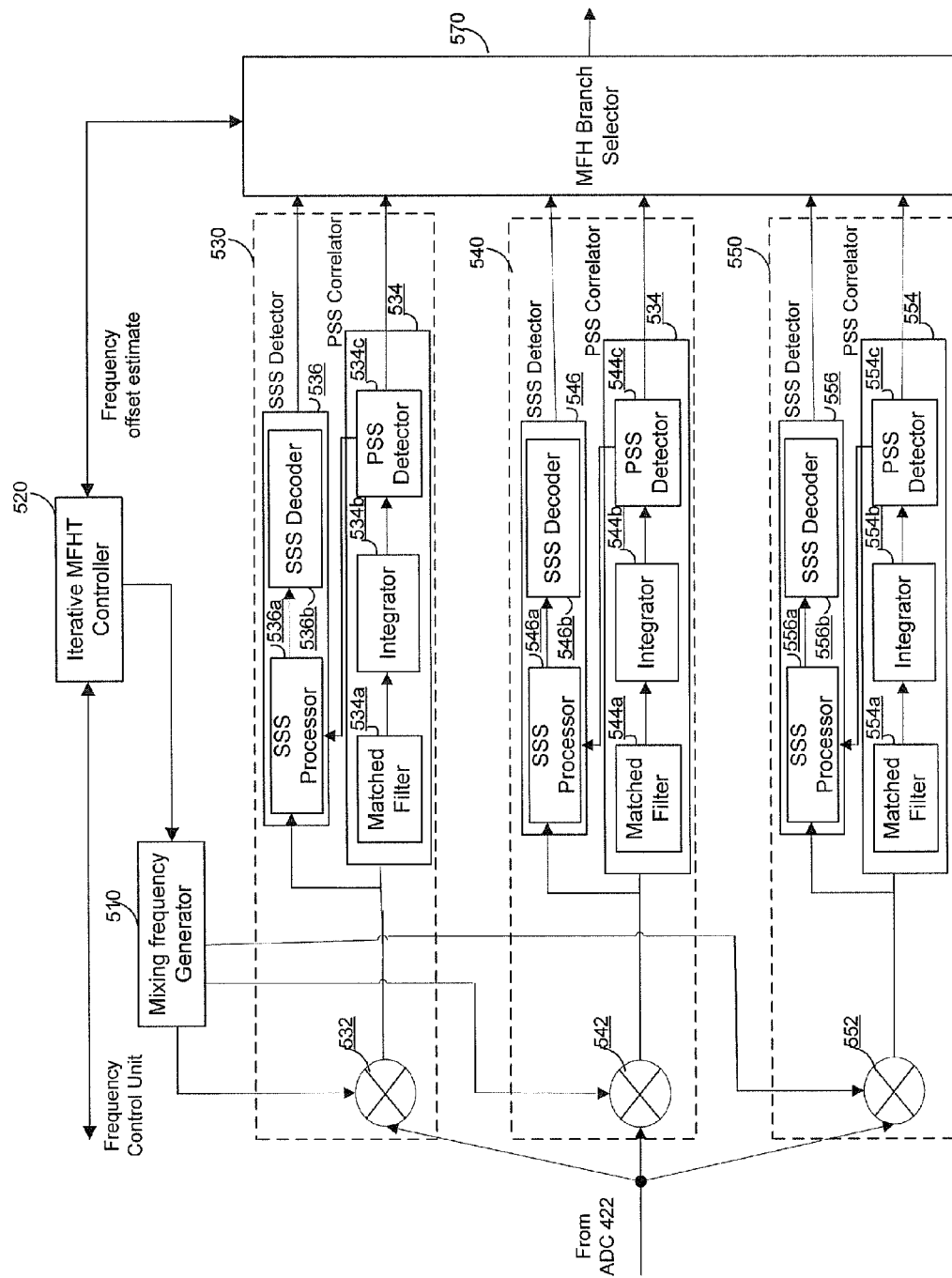
FIG. 5 is a block diagram illustrating an exemplary MFH sub-system that is operable to utilize a reduced number of MFH branches to perform iterative MFHT with Cell-ID detection in an E-UTRA/LTE UE receiver, in accordance with an embodiment of the invention.

FIG. 5 is a block diagram illustrating an exemplary MFH sub-system that is operable to utilize reduced number of MFH branches to perform iterative MFHT with Cell-ID detection in an E-UTRA/LTE UE receiver, in accordance with an embodiment of the invention. Referring to FIG. 5, there is shown a MFH sub-system 500 comprising a mixing frequency generator 510, an iterative MFHT controller 520, three MFH branches 530-550, and a MFH branch selector 570. A MFH branch such as the MFH branch 530 comprises a mixer 532, a PSS correlator 534 and a SSS detector 536. The PSS correlator 534 comprises a matched filter 534a, an integrator 534b, and a PSS detector 534c. The SSS detector 536 comprises a SSS processor 536a and a SSS decoder 536b.

The mixing frequency generator 510 may comprise suitable logic, circuitry, interfaces and/or code that may be operable to generate mixing frequencies for the three MFH branches 530-550, respectively. In this regard, a first frequency offset may be applied to a first MFH branch 530, a second frequency offset may be applied to a second MFH branch 540, and a third frequency offset may be applied to a third MFH branch 550. The mixing frequencies may be generated based on a frequency offset estimate range provided or assigned by the iterative MFH controller 520. The generated mixing frequencies may evenly or unevenly span, depending on the statistics of receiver local oscillator signal frequency offset, across the frequency offset estimate range. The mixing frequency generator 510 may be updated with a new frequency offset estimate range at each iteration. The generated mixing frequencies may be communicated to the MFH branches 530-550 for frequency offsetting the digital baseband signal received from the ADC 422 in each MFH branch.

The iterative MFHT controller 520 may comprise suitable logic, circuitry, interfaces and/or code that may be operable to manage and/or control iteration operations of the MFH sub-system 500. For example, the iterative MFHT controller 520 may be operable to activate or deactivate iteration operation of the iterative MFHT based on frequency offset information derived within each iteration. The iterative MFH controller 520 may be operable to communicate with the MFH branch selector 570 to track information such as, for example, a frequency offset estimate and/or Cell-ID from iteration to iteration. At each iteration, the iterative MFHT controller 520 may compare a corresponding frequency offset estimate with a frequency offset range utilized by the frequency control unit 440 for AFC. In instances where the corresponding frequency offset estimate at a current iteration is within the frequency offset range, the iterative MFHT controller 520 may stop iteration of the iterative MFHT. Otherwise, the iterative MFHT controller 520 may continue iteration operation of the iterative MFHT. The iterative MFHT controller 520 may adjust a frequency offset estimation range utilized in the current iteration to prepare for the next iteration. For example, the frequency offset estimation range for the current iteration may be adjusted or reduced by a factor, given by the number of hypotheses used, and applied to the next iteration. The iterative MFH controller 520 may communicate the adjusted frequency offset estimation range to the mixing frequency generator 510 so as to generate mixing frequencies for the next iteration.

A MFH branch such as the MFH branch 530 may comprise suitable logic, circuitry, interfaces and/or code that may be operable to support operations required for an iterative MFHT. The MFH branch 530 may be operable to iteratively perform a full synch acquisition whenever needed. An iteration in the MFH branch 530 may start with an initial frequency offset assigned by the mixing frequency generator 510. The MFH branch 530 may be operable to frequency offset the digital baseband signal received from the ADC 422 via the mixer 532. A PSS correlation process may be performed on the resulting digital baseband signal via the PSS correlator 534. Following the PSS processing, the SSS detection may be performed for cell-specific information via the SSS detector 536. A full synch acquisition may be performed in the MFH branch 530 for fast synch acquisition. In this regard, the Cell-ID detection may be implemented or performed at each iteration. Within each iteration, by the time that a frequency offset estimate is determined in the MFH branch 530, associated cell-specific information such as Cell-ID and/or the CP length utilized for a serving cell may also be available as well. The iteration in the MFH branch 530 may be ended with providing the determined frequency offset and/or the detected cell-specific information to the MFH branch selector 570 for further processing.

A mixer such as the mixer 532 may comprise suitable logic, circuitry, interfaces and/or code that may be operable to mix the digital baseband signal received from the ADC 422 with a mixing frequency assigned by the mixing frequency generator 510. The mixing frequency may indicate an initial frequency offset applied to the MFH branch 530.

A PSS correlator such as the PSS correlator 534 may comprise suitable logic, circuitry, interfaces and/or code that may be operable to perform a correlation process to acquire PSS synchronization. The PSS correlator 534 may be operable to utilize the matched filter 534a to perform a PSS correlation process on the signal received from the mixer 532. The resulting PSS correlation data may be communicated with the integrator 534b for identifying possible PSS timing hypotheses.

A matched filter such as the matched filter 534a may comprise suitable logic, circuitry, interfaces and/or code that may be operable to correlate signals from the mixer 532 with each of a plurality of local reference PSSs. The resulting PSS correlation data may be provided to the integrator 534b for further processing.

An integrator such as the integrator 534b may comprise suitable logic, circuitry, interfaces and/or code that may be operable to accumulate the PSS correlation data from the matched filter 534a over a one or multiple time slots duration, for example. The resulting PSS correlation peaks may indicate possible PSS symbol timing hypotheses under consideration.

The PSS detector 534c may comprise suitable logic, circuitry, interfaces and/or code that may be operable to identify a candidate PSS according to the maximum correlation peak magnitude at the output of the integrator 534b. The position of the maximum correlation peak magnitude may indicate PSS symbol timing of the identified candidate PSS in the MFH branch 530. The identified candidate PSS and PSS symbol timing may be communicated with the MFH branch selector 570 so as to select a particular MFH branch over the three MFH branches 530-550.

The MFH branch selector 570 may comprise suitable logic, circuitry, interfaces and/or code that may be operable to select a particular MFH branch at each iteration over the three MFH branches 530-550 in the MFH sub-system 500. The MFH branch selector 570 may be operable to determine a particular MFH branch based on the magnitude of the maximum PSS correlation peaks. The selected MFH branch may be implied by the highest PSS correlation peak magnitude over the three MFH branches 530-550. The MFH branch selector 570 may be operable to perform a consistency check on available cell-specific information such as Cell-ID, that is, checking the consistency of cell ID information between the first and second halves of a radio frame for the branch selected from three MFH branches 530-550 at each iteration as well as from iteration to iteration. For example, a detected Cell-ID may be checked for consistency, that is, checking the consistency of cell ID information between the first and second halves of a radio frame for the branch selected from three MFH branches 530-550 not only within a particular iteration, but also from iteration to iteration. The MFH branch selector 570 may declare the detected Cell-ID for a serving cell if the Cell-ID is consistently detected, that is, checking the consistency of cell ID information between the first and second halves of a radio frame for the branch selected from three MFH branches 530-550 not only within a particular iteration, but also from iteration to iteration. The MFH branch selector 570 may communicate frequency estimates from iteration to iteration with the frequency control unit 440 for frequency control. Cell-specific information such as symbol timing, frame timing, Cell-ID, and/or CP length may be communicated with the processor 426 for communications within the serving cell.

In an exemplary operation, the MFH sub-system 500 may be operable to receive a corresponding digital baseband signal of a RF signal received from the antenna 310, for example. The received RF signal may comprise a PSS and a SSS. The received digital baseband signal may be iteratively processed utilizing the three MFH branches 530-550, respectively, for accurate timing and/or frequency offset of a corresponding transmission. In this regard, the iterative MFHT controller 520 may be operable to coordinate operations of the MFH branches 530-550, the mixing frequency generator 510 and/or the MFH branch selector 570 from iteration to iteration. For example, the iterative MFHT controller 520 may monitor a frequency offset estimate from the MFH branch selector 570 at each iteration to determine whether to continue or stop iteration in the iteration MFHT. Iterations in the iterative MFHT may continue until a frequency offset estimate from the MFH branch selector 570 falls within the frequency acquisition range of the automatic frequency control system associated with the receiver, for example. A frequency offset estimation range may be adjusted at the end of each iteration to prepare for the next iteration. The iterative MFHT controller 520 may provide the adjusted frequency offset estimation range to the mixing frequency generator 510 for mixing frequencies utilized in the next iteration.

In each MFH branch, for example, the MFH branch 530, the digital baseband signal may be frequency offset via the mixer 532 from iteration to iteration utilizing mixing frequencies provided by the mixing frequency generator 510. At each iteration, a full synch acquisition may be performed in the MFH branch 530 through a PSS correlation process via the PSS correlator 534 and a SSS detection via the SSS detector 536. A Cell-ID detection may be implemented or performed at each iteration in the MFH branch 530. Information such as a frequency offset estimate and a detected Cell-ID may be available in the MFH branch 530 at the end of each iteration. Cell-specific information such as a Cell-ID may be checked for consistency, that is, checking the consistency of cell ID information between the first and second halves of a radio frame within the Cell ID detection process. A Cell-ID may be declared for a serving cell if the Cell-ID is consistently detected not only within a particular branch for a particular iteration, but also from iteration to iteration. From iteration to iteration the MFH branch producing consistent cell ID information may differ. Information such as determined frequency offset estimates and/or detected Cell-ID may be provided by the MFH sub-system 500 from iteration to iteration to support frequency control and/or communications within the serving cell.

Figure 6:
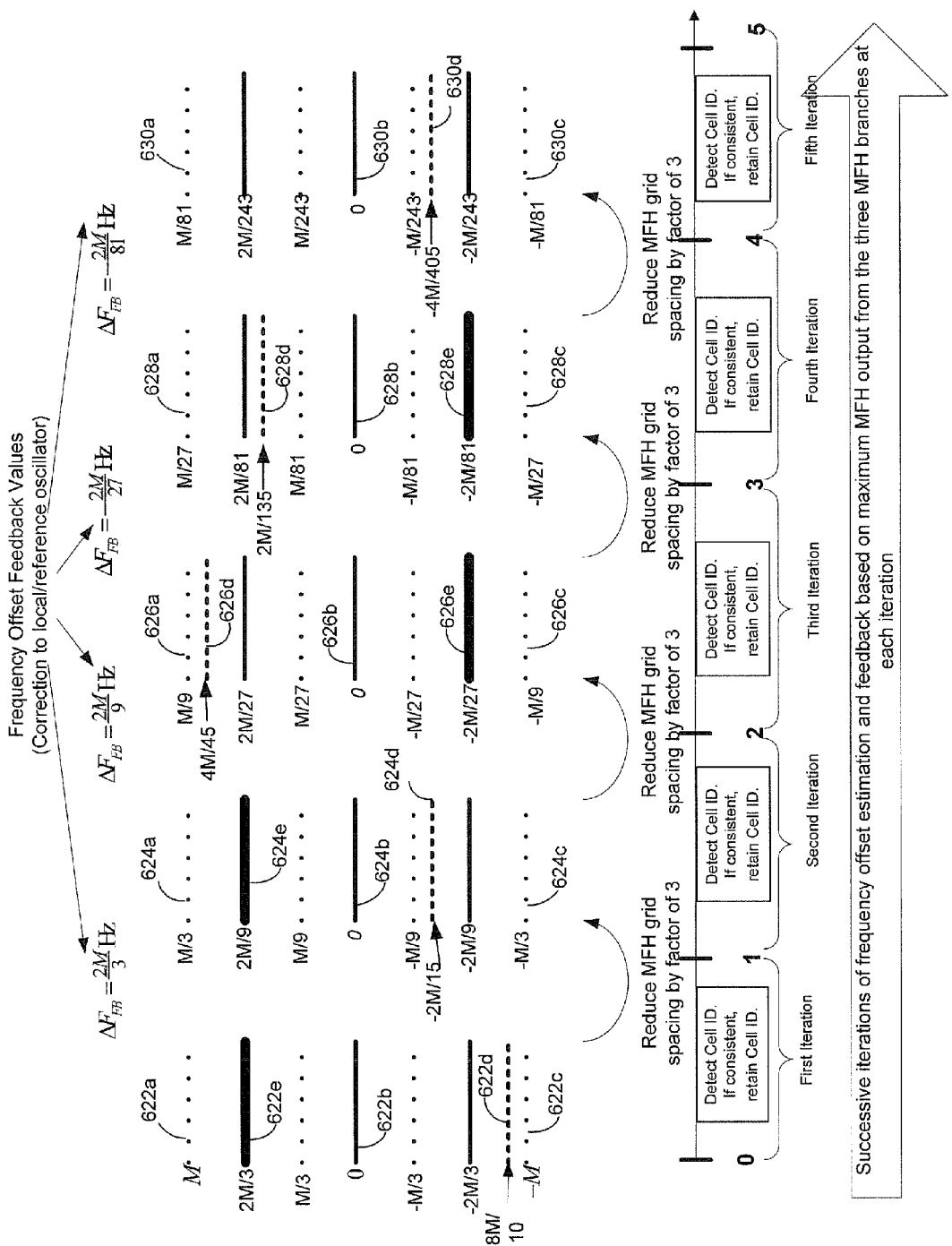
FIG. 6 is a diagram illustrating an exemplary iterative process in an iterative MFHT with Cell ID detection, in accordance with an embodiment of the invention.

FIG. 6 is a diagram illustrating an exemplary iterative process in an iterative MFHT with Cell ID detection, in accordance with an embodiment of the invention. Referring to FIG. 6, an upper relative frequency offset range boundary 622a, 624a, 626a, 628a, and 630a may be illustrated for a first iteration, a second iteration, a third iteration, a fourth iteration, and a fifth iteration, respectively. Similarly, a lower relative frequency offset range boundary 622c, 624c, 626c, 628c, and 630c may be illustrated for a first iteration, a second iteration, a third iteration, a fourth iteration, and a fifth iteration, respectively. Similarly, a center frequency offset, between the lower relative frequency offset range boundary and the higher relative frequency offset range boundary 622b, 624b, 626b, 628b, and 630b may be illustrated for a first iteration, a second iteration, a third iteration, a fourth iteration, and a fifth iteration, respectively. An exemplary residual frequency offset 622d, 624d, 626d, 628d, and 630d from the respective desired local oscillator frequency for a first iteration, second iteration, third iteration, fourth iteration, and fifth iteration, may also be illustrated, with respect to the oscillator frequency at each iteration. A branch may be selected on the basis of greatest correlation magnitude for a first iteration, a second iteration, a third iteration and a fourth iteration respectively, and may be illustrated by 622e, 624e, 626e and 628e.

Each exemplary illustration may be illustrated by a set of frequency range boundaries. For example, the first iteration may be illustrated by a higher frequency offset range boundary 622a at M Hz, a center frequency offset 622b at 0 Hz, and a lower frequency offset boundary at −M Hz. Similar boundaries, as introduced above, are illustrated for iterations 2 through 5, respectively. There is also shown a feedback correction value $\Delta F_{FB}$ applied to the local oscillator frequency after each iteration.

As in the example illustrated in FIG. 6 above, assume that due to channel conditions and/or for system purposes, it may be known that the frequency offset may be d∈{−M,M}. Furthermore, as illustrated by an initial local oscillator frequency offset 622d, d=−8M/10, i.e. a received signal may be at a frequency (x+d)=x−8M/10, and so a frequency offset estimate s'=8M/10 would perfectly offset d, that is (x+d+s')=x. The branch within the MFH structure providing an advantageous offset correction to this offset may be the one located at an offset frequency of 2M/3, which may produce the greatest PSS correlation magnitude from the set of correlators employed in connection with FIG. 4A, in accordance with various embodiments of the invention. This exemplary selection may be denoted by 622e, in FIG. 6.

As illustrated in FIG. 4B, in the first iteration, for an exemplary value of d=−8M/10, the hypothesis of interval 480 may be chosen, and correspondingly, the local oscillator frequency may be corrected by $\Delta F_{FB}$. Thus, as may be seen from FIG. 4B, the center value of interval 480 may be 2M/3, and thus a $\Delta F_{FB}$=2M/3 may be fed back to the local oscillator and result in a new residual local oscillator offset frequency 624d. Thus, an offset value $\Delta F_{FB}$=2M/3 may be applied to the local oscillator frequency. As shown in FIG. 4B, as the appropriate frequency offset after a first iteration is known to be located in hypothesis interval 480, the hypothesis intervals in the second iteration may only need to span the hypothesis interval 480, and may thus be 3 times shorter. In other words, the uncertainty about the remaining frequency offset may be reduced to within a frequency range of interval 480 because it may now be known that the true frequency offset may be located somewhere within the frequency range defined by interval 480.

Hence, the lower relative frequency offset boundary 624c, as illustrated in FIG. 4B, may be set to −M/3 with respect to the center frequency 624b, and the higher frequency offset boundary 624a, may be set to M/3, also with respect to the center frequency 624b. Thus, after a first iteration, an estimate for the appropriate frequency offset to compensate for d=−0.8M is s'[1]=0.666M, and the residual local oscillator offset frequency 624d may be 8M/10−0.6666M=−2M/15. For each further iteration, the range between the upper relative frequency offset boundary and the lower relative frequency offset boundary may similarly be reduced by a factor, given by the number of hypotheses used, three in this exemplary embodiment of the invention discussed, by appropriately adjusting the local oscillator frequency. Thus, for the third iteration, the higher frequency offset boundary 626a may be given by M/9 with respect to the center frequency 626b, while the lower frequency offset boundary 626c may be −M/9 with respect to the center frequency 626b, and the local oscillator frequency may be adjusted by 2M/9, leading to a cumulative local oscillator frequency adjustment, over the successive iterations up to the present iteration of 0+2M/3+2M/9=8M/9, from the initial local oscillator frequency. Hence, the offset of the oscillator frequency from its desired value has been reduced to −8M/10+8M/9=4M/45. Similarly, the further iterations may further reduce the frequency uncertainty, by further reducing the local oscillator frequency offset from the desired local oscillator frequency. After iteration 4, the frequency offset from the desired local oscillator frequency 630b for the 5th iteration may be only −4M/405 offset in this exemplary illustration.

From the exemplary iterations in FIG. 6, it is thus clear that faster convergence may be achieved with a larger number of hypotheses that may be used, based on a desired accuracy, the number of iterations may be determined. As shown in FIG. 4B, in instances where the interval 480, for example, may be selected, and an offset frequency of 2M/3 may be used to correct the local oscillator frequency offset, the largest error may be if the actual offset −d may be located at either extreme of the interval 480, that is, at M/3 or at −M/3. In these instances, the error may be half the size of an interval 480, or M/3, as illustrated in FIG. 4B. Thus, for the example shown in FIG. 6, after the 4th iteration, the local oscillator adaptation over the preceding four iterations may amount to a cumulative correction of 64M/81 to the local oscillator frequency (with respect to the initial frequency 622b) and may be achieved by iteratively adjusting the local oscillator frequency. The exemplary error may be at most M/81, as illustrated by the upper relative frequency range boundary 630a. In a similar manner, a desirable maximum error may be determined, and the number of required iterations may be determined.

As shown in FIG. 6, Cell-ID detection may be implemented or performed at each iteration of the iterative MFHT. The consistency of a Cell-ID detected, that is, checking the consistency of cell ID information between the first and second halves of a radio frame, at a particular iteration such as the second iteration may be checked for the MFH branches selected from the MFH branches 530-550 on the basis of maximum PSS correlation magnitude, not only within the second iteration, but also from iteration to iteration for the branch producing the greatest PSS correlation magnitude, so as to declare the detected Cell-ID for a serving cell.

Figure 7:
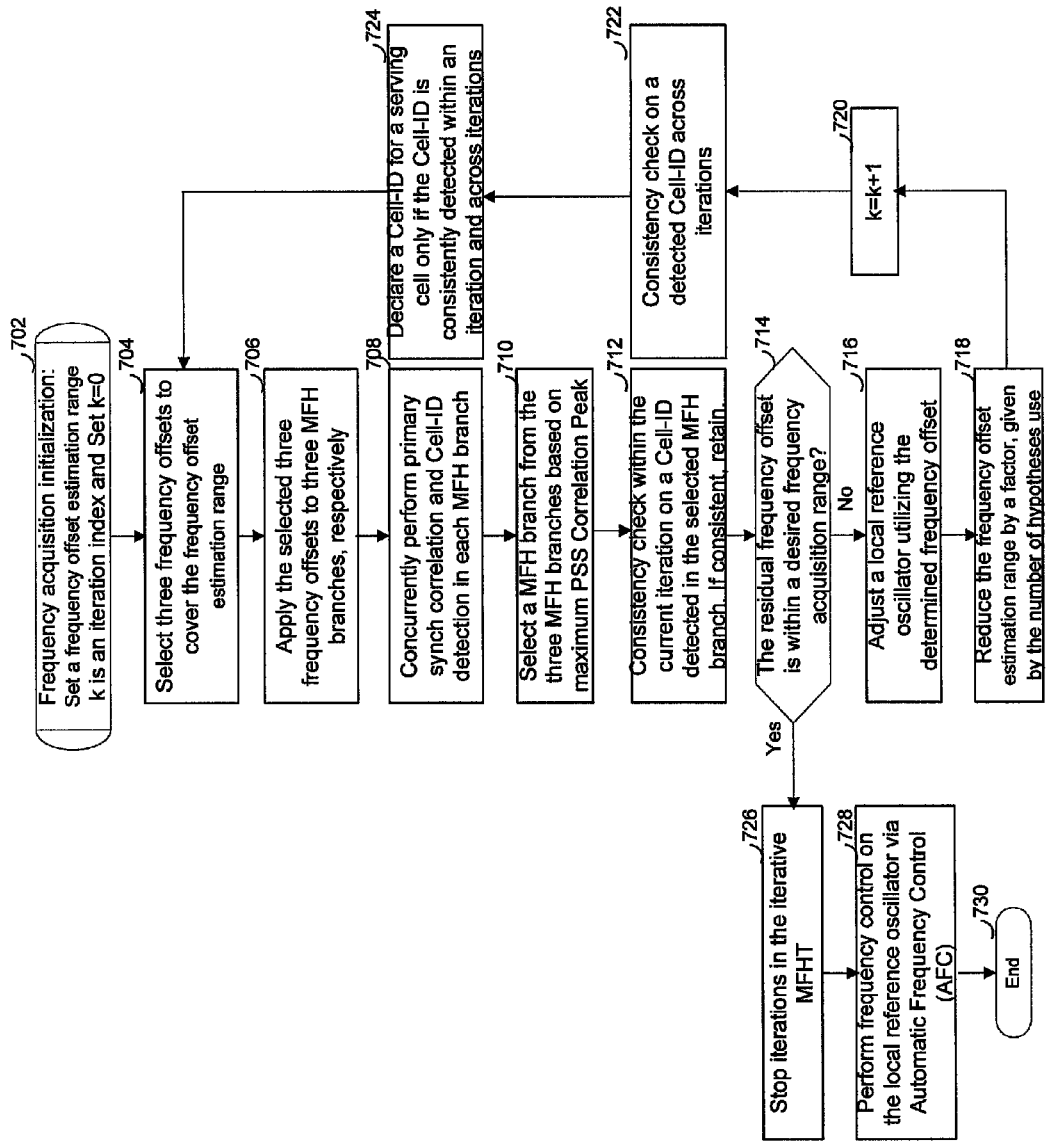
FIG. 7 is a diagram illustrating exemplary steps utilized by an E-UTRA/LTE UE receiver that utilizes a reduced number of MFH branches to perform MFHT with Cell-ID detection, in accordance with an embodiment of the invention.

FIG. 7 is a diagram illustrating exemplary steps utilized by an E-UTRA/LTE UE receiver that utilizes reduced number of MFH branches to perform MFHT with Cell-ID detection, in accordance with an embodiment of the invention. The exemplary steps may start with the step 702. In step 702, the iterative MFHT controller 520 may be operable to set a frequency offset estimation range for an iterative MFHT. Parameter k is an iteration index and k=0. The iterative MFHT 520 may be operable to communicate the frequency offset estimation range to the mixing frequency generator 510. In step 704, the mixing frequency generator 510 may be operable to select three initial frequency offsets for the current iteration. The selected three initial frequency offsets may evenly or unevenly span, depending on the statistics of receiver local oscillator signal frequency offset, over the frequency offset estimation range. In step 706, the mixing frequency generator 510 may be operable to communicate with the mixers 532, 542 and 552 to apply the selected three initial frequency offsets in the three MFH branches 530, 540 and 550, respectively.

In step 708, primary synchronization correlation and Cell-ID detection may be performed concurrently in each MFH branch. In step 710, the MFH branch selector 570 may be operable to select a particular MFH branch for the current iteration from the three MFH branches 530-550 based on a maximum PSS correlation peak magnitude. In step 712, a consistency check on a Cell-ID detected in the selected MFH branch is performed at the end of the current iteration, that is, the consistency of cell ID information between the first and second halves of a radio frame is checked. For example, the detected Cell-ID in the selected MFH branch may be retained if the Cell-ID is consistently detected over the first and second halves of a frame as denoted in FIG. 2. Otherwise, the detected Cell-ID in the selected MFH branch may be discarded. In step 714, it may be determined whether the residual frequency offset in the selected MFH branch is within a desired frequency offset range. In instances where the determined frequency offset in the selected MFH branch is not within a desired frequency offset range, then in step 716, iterations in the iterative MFHT continues.

The frequency control unit 440 may be operable to adjust the local reference oscillator 430 utilizing the determined frequency offset. In step 718, the iterative MFHT controller 520 may be operable to reduce the frequency offset estimation range utilized for the current iteration by a factor given by the number of hypotheses used. The reduced frequency offset estimation range may be applied to the next iteration of the iterative MFHT. In step 720, the iteration index k is increased by a step of 1. In step 722, a Cell-ID consistency check may be performed across iterations. In step 724, a Cell-ID may be declared for a serving cell if the Cell-ID is consistently detected within iterations as well as from iteration to iteration. The exemplary steps may return to step 704.

In step 714, in instances where the residual frequency offset in the selected MFH branch is within the desired frequency offset range, then the exemplary steps may proceed to step 726. In step 726, the iterative MFHT controller 520 may stop iterations in the iterative MFHT. In step 728, the frequency control unit 440 may be operable to perform frequency control of the local oscillator 430 via AFC. The exemplary steps may end in step 730.

In various exemplary aspects of the method and system for iterative multiple frequency hypothesis testing with Cell-ID detection in an E-UTRA/LTE UE receiver, a mobile device such as the mobile device 114 may be operable to receive a radio frequency (RF) signal from the base station 110*a*. The received signal may comprise a PSS and a SSS. The received PSS and SSS may be used by the mobile device 114 to acquire cell-specific parameters via the PSS synchronization and the SSS detection, respectively. To overcome uncertainties on the correct PSS symbol timing and/or correct frequency offset for the received PSS while utilizing limited processing resources, the mobile device 114 may be operable to perform an iterative multiple frequency hypothesis testing via the MFH sub-system 424. A reduced number of MFH branches, for example, the three MFH branches 530-550, may be utilized to implement the iterative MFHT. At each iteration of the iterative MFHT, the MFH sub-system 424 may be operable to concurrently perform frequency offset estimation and Cell-ID detection.

An iteration of the iterative MFHT may start with three initial frequency offsets selected or generated by the mixing frequency generator 510. The generated three initial frequencies may evenly or unevenly span, depending on the statistics of receiver local oscillator signal frequency offset, over a frequency offset estimation range provided by the iterative MFHT controller 520. The mixing frequency generator 510 may be operable to apply the three generated initial frequency offsets to the MFH branches 530-550, respectively. In each MFH branch, the frequency offset estimation and the Cell-ID detection may be concurrently performed on the received signal at a current iteration of the iterative MFHT. The MFH branch selector 570 may be operable to select a particular MFH branch with a maximum PSS correlation peak at the current iteration from the three MFH branches 530-550.

A frequency offset estimate associated with the selected MFH branch may be utilized by the frequency control unit 440 for frequency control of the local frequency oscillator 430 utilized in the mobile device 300. In instances where the frequency offset estimate associated with the selected MFH branch is within a desired frequency offset range, iterations of the iterative MFHT may be stopped. Otherwise, iterations of the iterative MFHT may continue. In this regard, at the end of the current iteration, the iterative MFHT controller 520 may adjust or reduce by a factor, given by the number of hypotheses used, the frequency offset estimation range utilized for the current iteration to prepare for the next iteration. The adjusted frequency offset estimation range may be provided to the mixing frequency generator 510. Three different subsequent frequency offsets may be generated by the mixing frequency generator 510 based on the adjusted frequency offset estimation range. In instances where a Cell-ID is consistently detected not only within a particular iteration, that is, checking the consistency of cell ID information between the first and second halves of a radio frame, but also from iteration to iteration, the Cell-ID may be declared for a serving cell. The mobile device 114 may be operable to utilize information that comes from the iterative MFHT with Cell ID detection to start camping on the declared serving cell.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for iterative multiple frequency hypothesis testing with Cell-ID detection in an E-UTRA/LTE UE receiver.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication in a wireless communication device, comprising:
   performing a plurality of iterations, of an iterative multiple frequency hypothesis testing (MFHT), the iterative MFHT including:
      multiplying, by the wireless communication device, a signal, having a primary synchronization sequence (PSS) and a secondary synchronization sequence (SSS), with a plurality of iterative frequency offset hypotheses tests to provide a plurality of frequency offset hypotheses, the plurality of iterative frequency offset hypotheses corresponding to a plurality of frequency offsets; and
      concurrently selecting, by the wireless communication device, a candidate PSS from at least one of the plurality of frequency offset hypotheses to determine a frequency offset estimation, and decoding a candidate SSS from the at least one of the plurality of frequency offset hypotheses using the candidate PSS for a cell group information identification within each iteration of the MFHT.

2. The method of claim 1, wherein the step of decoding comprises:
   estimating, using the candidate PSS, a characteristic of a channel to provide an estimate of the channel; and
   decoding, using the estimate of the channel, the candidate SSS from among the plurality of frequency offset hypotheses for the cell group information identification.

3. The method of claim 2, wherein the step of decoding further comprises:
   decoding the candidate SSS for at least one selected of: a frame boundary synchronization and a cyclic prefix (CP) length.

4. The method of claim 1, further comprising:
   determining whether the cell group information identification corresponding to a first portion of the at least one of the plurality of frequency offset hypotheses is consistent with the cell group information identification corresponding to a second portion of the at least one of the plurality of frequency offset hypotheses.

5. The method of claim 1, wherein the step of selecting comprises:
   correlating one or more slots from among each of the plurality of frequency offset hypotheses with a locally generated reference PSS; and
   selecting the one or more slots having a largest correlation as a corresponding one of the plurality of candidate PSSs.

6. The method of claim 1, further comprising:
   receiving the signal having the PSS and the SSS.

7. A method for communication in a wireless communication device, comprising:
   performing, by the wireless communication device, an iterative process to determine a frequency offset of a receiver local oscillator signal, the iterative process including:
      multiplying a signal, having a primary synchronization sequence (PSS) and a secondary synchronization sequence (SSS), with a plurality of iterative frequency offset hypotheses tests to provide a plurality of frequency offset hypotheses corresponding to a plurality of frequency offsets,
      correlating a locally generated reference PSS and each of the plurality of frequency offset hypotheses to provide a plurality of PSS hypotheses,
      concurrently selecting, by the wireless communication device, a candidate PSS from at least one of the plurality of frequency offset hypotheses to determine the frequency offset, and decoding a plurality of candidate SSSs from the plurality of frequency offset hypotheses using the plurality of PSS hypotheses for a plurality of cell group information identification within each iteration of the iterative process, and
      adjusting the frequency of the receiver local oscillator signal using a corresponding frequency offset from among the plurality of frequency offsets that corresponds to one of the plurality of PSS hypotheses having a highest correlation; and
   varying, by the wireless communication device, the plurality of iterative frequency offset hypotheses tests and performing the iterative process until a residual frequency offset of the receiver local oscillator signal is within an acceptable margin of error.

8. The method of claim 7, further comprising:
   determining whether the cell group information identification corresponding to a first iteration is consistent with the cell group information identification corresponding to a second iteration.

9. The method of claim 7, further comprising:
   determining a difference between an actual frequency of the receiver local oscillator signal and a desired frequency of the receiver local oscillator signal to provide the residual frequency offset.

10. The method of claim 7, further comprising:
    receiving the signal having the PSS and the SSS.

11. A baseband processor for processing communication signals in a wireless communication device, comprising:
    a plurality of multipliers configured to multiply a signal, having a primary synchronization sequence (PSS) and a secondary synchronization sequence (SSS), with a plurality of iterative frequency offset hypotheses tests to provide a plurality of frequency offset hypotheses, the plurality of iterative frequency offset hypotheses corresponding to a plurality of frequency offsets;
    a PSS processor configured to select a candidate PSS from at least one of the plurality of frequency offset hypotheses to determine a frequency offset estimation; and a SSS decoder configured to decode a candidate SSS from the at least one of the plurality of frequency offset hypotheses using the candidate PSS for a cell group information identification, wherein the PSS processor and the SSS decoder are configured to implement an iterative process, the PSS processor and the SSS decoder being configured to concurrently determine the frequency offset estimation and the cell group information identification, respectively, within each iteration of the iterative process.

12. The baseband processor of claim 11, wherein the SSS decoder is further configured to estimate, using the candidate PSS, a characteristic of a channel to provide an estimate of the channel and to decode, using the estimate of the channel, the candidate SSS from among the plurality of frequency offset hypotheses for the cell group information identification.

13. The method of claim 12, wherein the SSS decoder is further configured to decode the candidate SSS for at least one of: a frame boundary synchronization and a cyclic prefix (CP) length.

14. The method of claim 11, further comprising:

a branch selector configured to determine whether the cell group information identification corresponding to a first portion of the at least one of the plurality of frequency offset hypotheses is consistent with the cell group information identification corresponding to a second portion of the at least one of the plurality of frequency offset hypotheses.

15. The method of claim 11, wherein the PSS processor is further configured to correlate one or more slots from among each of the plurality of frequency offset hypotheses with a locally generated reference PSS and to select the one or more slots having a largest correlation as a corresponding one of the plurality of candidate PSSs.

* * * * *

UNITED STATES PATENT AND TRADEMARK OFFICE
CERTIFICATE OF CORRECTION

PATENT NO. : 8,369,279 B2
APPLICATION NO. : 12/732052
DATED : February 5, 2013
INVENTOR(S) : Swarts et al.

It is certified that error appears in the above-identified patent and that said Letters Patent is hereby corrected as shown below:

In the Claims:

Column 25, line 30, please replace "iterations, of" with --iterations of--.

Signed and Sealed this
Fourteenth Day of May, 2013

Teresa Stanek Rea
*Acting Director of the United States Patent and Trademark Office*